US009161015B2

(12) United States Patent
Myokan et al.

(10) Patent No.: US 9,161,015 B2
(45) Date of Patent: Oct. 13, 2015

(54) IMAGE PROCESSING APPARATUS AND METHOD, AND PROGRAM

(75) Inventors: Yoshihiro Myokan, Kanagawa (JP);
Takayuki Yoshigahara, Tokyo (JP);
Kiyoto Someya, Tokyo (JP)

(73) Assignee: Sony Corporation, Tokyo (JP)

( * ) Notice: Subject to any disclaimer, the term of this patent is extended or adjusted under 35 U.S.C. 154(b) by 775 days.

(21) Appl. No.: 13/354,730

(22) Filed: Jan. 20, 2012

(65) Prior Publication Data

US 2012/0194652 A1  Aug. 2, 2012

(30) Foreign Application Priority Data

Jan. 31, 2011  (JP) ................ P2011-019274
Dec. 5, 2011  (JP) ................ P2011-266044

(51) Int. Cl.
*H04N 13/02*  (2006.01)
*H04N 13/00*  (2006.01)
*G06T 7/00*  (2006.01)

(52) U.S. Cl.
CPC ............ *H04N 13/0246* (2013.01); *G06T 7/002* (2013.01); *G06T 7/0075* (2013.01); *H04N 13/0022* (2013.01); *H04N 13/0239* (2013.01); *G06T 2207/10012* (2013.01); *G06T 2207/30196* (2013.01)

(58) Field of Classification Search
CPC .......... H04N 13/0022; H04N 13/0239; H04N 13/0246; G06T 7/0075; G06T 7/002
USPC .......... 345/419; 348/47, 48, 50; 382/154, 294
See application file for complete search history.

(56) References Cited

U.S. PATENT DOCUMENTS

| 5,142,357 | A  | * | 8/1992  | Lipton et al. ............ 348/48 |
| 2006/0083421 | A1 | * | 4/2006  | Weiguo et al. ............ 382/154 |
| 2011/0255775 | A1 | * | 10/2011 | McNamer et al. ............ 382/154 |
| 2011/0261050 | A1 | * | 10/2011 | Smolic et al. ............ 345/419 |
| 2012/0051665 | A1 | * | 3/2012  | Adams et al. ............ 382/294 |
| 2013/0278727 | A1 | * | 10/2013 | Tamir et al. ............ 348/47 |

OTHER PUBLICATIONS

Office Action dated Jan. 9, 2015 for CN Patent Application No. 201210019744.9.

* cited by examiner

*Primary Examiner* — Y Lee
*Assistant Examiner* — Neil Mikeska
(74) *Attorney, Agent, or Firm* — Sony Corporation

(57) ABSTRACT

An image processing apparatus includes an image obtaining unit configured to obtain a plurality of images, which are images of the same subject captured from different viewpoints; an image offset correction unit configured to modify the plurality of images obtained by the image obtaining unit on the basis of parameters for correcting image offset and generate a correction image for each of the obtained images; an evaluation value calculation unit configured to calculate, as an evaluation value, an integration value, for an entire screen, of an error amount indicating a degree at which association in a parallax direction among the plurality of correction images generated by the image offset correction unit is not possible; and an update unit configured to change a parameter that is necessary for association in the parallax direction among the parameters so as to update the parameter so that the evaluation value becomes a minimum.

13 Claims, 23 Drawing Sheets

FIG. 2
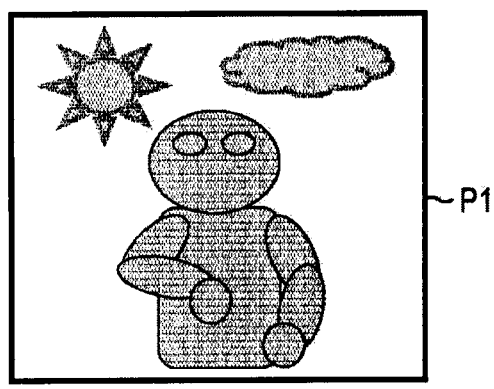
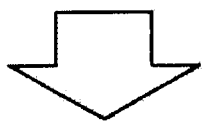
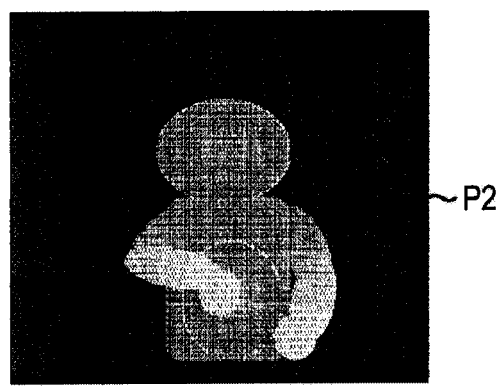

IMAGE PROCESSING APPARATUS AND METHOD, AND PROGRAM

BACKGROUND

The present disclosure relates to an image processing apparatus and method, and a program. More particularly, the present disclosure relates to an image processing apparatus and method, and a program that are capable of easily calibrating an error due to an offset of a camera in an image-capturing direction when a disparity image (depth image) is to be generated.

A technology of capturing an image of the same subject from different angles by using a plurality of cameras and generating a disparity image (depth image) on the basis of a corresponding point search of the parallax directions of individual images is generally becoming popular.

In general, when generating a disparity image, if an offset between image-capturing directions of a plurality of cameras occurs, an error will occur, and an accurate disparity image will not be obtained. For this reason, when a disparity image is to be generated, calibration for minimizing an error that occurs due to an offset between the image-capturing directions of the cameras is necessary.

Regarding calibration, a technology in which, for example, an image called a calibration pattern, which is formed from a plan chart having a plurality of feature points for which the position relationship has already been obtained is captured, and calibration is performed on the basis of the image-capturing result of the calibration pattern (refer to "A Flexible New Technique for Camera Calibration").

Furthermore, a technology in which feature points are detected from an image used to obtain a disparity image, a calibration parameter for specifying an image-capturing direction, the calibration parameter being used to perform calibration of a camera, is obtained, and calibration is performed using the obtained calibration parameter, has been proposed (refer to "Self-calibration of stereo camera, Fumiaki TOMITA, et al., Information Processing, May 1990").

SUMMARY

However, in the technology of "A Flexible New Technique for Camera Calibration", it is necessary to capture an image of a calibration pattern, which takes time and effort in the user environment, and necessary operation content is not practical when the operation content is considered. Furthermore, if this process is to be performed at the time of manufacture, the manufacturing cost is caused to increase. In addition, guarantee of machine accuracy against long-term deterioration becomes necessary, and the material cost and the assembly cost of machine parts will increase.

In addition, in the technology of "Self-calibration of stereo camera", Fumiaki TOMITA, et al., Information Processing, May 1990, since calibration greatly depends on the detection accuracy of feature points that are obtained from an image, the robustness of calibration is low. Furthermore, dedicated hardware or software processing for performing feature point detection becomes necessary separately. In a configuration in which calibration is performed in a user environment or in a configuration in which calibration is performed at the time of manufacture, the cost is caused to increase.

It is desirable to enable calibration to be easily performed by minimizing an error amount while a parameter that adjusts an offset between image-capturing directions of a plurality of cameras is changed when a disparity image is to be generated.

According to an embodiment of the present disclosure, there is provided an image processing apparatus including an image obtaining unit configured to obtain a plurality of images, which are images of the same subject captured from different viewpoints; an image offset correction unit configured to modify the plurality of images obtained by the image obtaining unit on the basis of parameters for correcting image offset and generate a correction image for each of the obtained images; an evaluation value calculation unit configured to calculate, as an evaluation value, an integration value, for an entire screen, of an error amount indicating a degree at which association in a parallax direction among the plurality of correction images that are generated by the image offset correction unit is not possible; and an update unit configured to change a parameter that is necessary for association in the parallax direction among the parameters so as to update the parameter so that the evaluation value becomes a minimum.

The update unit may change a shift amount, among the parameters, at coarse intervals of pixels in a two-dimensional direction over the entire range of the image so as to update the shift amount to a shift amount for which the evaluation value becomes a minimum, and further may change the shift amount at detailed intervals of pixels in the two-dimensional direction over a range in the vicinity of the shift amount searched by changing the shift amount at the coarse intervals of pixels so as to update the shift amount to a shift amount for which the evaluation value becomes a minimum.

The update unit may change inclination components, among the parameters, which are perpendicular to a parallax search direction, which is a direction of association among the plurality of images, so as to update the inclination components to inclination components for which the evaluation value becomes a minimum.

The update unit may divide the inclination components, among the parameters, in a direction perpendicular to a parallax search direction, which is a direction of association among the plurality of images, and may individually change the inclination component so as to update the inclination components to inclination components for which the evaluation value becomes a minimum.

The evaluation value calculation unit may calculate, as an evaluation value, an integration value, for the entire screen, of an error amount indicating a degree at which association in the parallax direction among the plurality of correction images that are generated by the image offset correction unit is not possible so that contribution made by a peripheral portion of the image is small.

The evaluation value calculation unit may calculate, as an entire screen total sum of difference absolute value sums of block matching, an integration value, for the entire screen, of an error amount indicating a degree at which association in the parallax direction among the plurality of correction images that are generated by the image offset correction unit is not possible, and may set a calculation result as an evaluation value.

The evaluation value calculation unit may calculate, using dynamic programming, an integration value, for the entire screen, of an error amount indicating a degree at which association in the parallax direction among the plurality of correction images that are generated by the image offset correction unit is not possible, and may set a calculation result as an evaluation value.

The evaluation value calculation unit may calculate, for each offset amount among the plurality of correction images, an integration value, for the entire screen, of an error amount indicating a degree at which association in the parallax direction among the plurality of correction images that are generated by the image offset correction unit is not possible, as an entire screen total sum of difference absolute value sums of block matching, and may set the local minimum value among the calculation results, in which the offset amount is closest to 0, as an evaluation value.

The evaluation value calculation unit may calculate, at each coarse offset interval among the plurality of correction images, an integration value, for the entire screen, of an error amount indicating a degree at which association in the parallax direction among the plurality of correction images that are generated by the image offset correction unit is not possible, as an entire screen total sum of difference absolute value sums of block matching, may search the calculation results in a range in which the offset amount is closest to 0 and a local minimum value is contained, and may set the local minimum value of the entire screen total sum that is obtained in detail in the searched range as an evaluation value.

According to another embodiment of the present disclosure, there is provided an image processing method for use with an image processing apparatus including an image obtaining unit configured to obtain a plurality of images, which are images of the same subject captured from different viewpoints, an image offset correction unit configured to modify the plurality of images obtained by the image obtaining unit on the basis of parameters for correcting image offset and generate a correction image for each of the obtained images, an evaluation value calculation unit configured to calculate, as an evaluation value, an integration value, for an entire screen, of an error amount indicating a degree at which association in a parallax direction among the plurality of correction images that are generated by the image offset correction unit is not possible, and an update unit configured to change a parameter that is necessary for association in the parallax direction among the parameters so as to update the parameter so that the evaluation value becomes a minimum, the image processing method including: obtaining, in the image obtaining unit, a plurality of images, which are images of the same subject captured from different viewpoints; modifying, in the image offset correction unit, the plurality of images that are obtained in the process of the image obtaining on the basis of a parameter for correcting image offset and generating a correction image for each of the obtained images; calculating, in the evaluation value calculation unit, as an evaluation value, an integration value, for an entire screen, of an error amount indicating a degree at which association in a parallax direction among the plurality of correction images that are generated in the process of the image offset correction is not possible; and changing, in the update unit, a parameter that is necessary for association in the parallax direction among the parameters and updating the parameter so that the evaluation value becomes a minimum.

According to another embodiment of the present disclosure, there is provided a program for causing a computer that controls an image processing apparatus to perform processing, the image processing apparatus including an image obtaining unit configured to obtain a plurality of images, which are images of the same subject captured from different viewpoints, an image offset correction unit configured to modify the plurality of images obtained by the image obtaining unit on the basis of parameters for correcting image offset and generate a correction image for each of the obtained images, an evaluation value calculation unit configured to calculate, as an evaluation value, an integration value, for an entire screen, of an error amount indicating a degree at which association in a parallax direction among the plurality of correction images that are generated by the image offset correction unit is not possible, and an update unit configured to change a parameter that is necessary for association in the parallax direction among the parameters so as to update the parameter so that the evaluation value becomes a minimum, the processing including: obtaining, in the image obtaining unit, a plurality of images, which are images of the same subject captured from different viewpoints; modifying, in the image offset correction unit, the plurality of images that are obtained in the process of the image obtaining on the basis of a parameter for correcting image offset and generating a correction image for each of the obtained images; calculating, in the evaluation value calculation unit, as an evaluation value, an integration value, for an entire screen, of an error amount indicating a degree at which association in a parallax direction among the plurality of correction images that are generated in the process of the image offset correction is not possible; and changing, in the update unit, a parameter that is necessary for association in the parallax direction among the parameters and updating the parameter so that the evaluation value becomes a minimum.

In an embodiment of the present disclosure, a plurality of images, which are images of the same subject captured from different viewpoints, are obtained, the plurality of obtained images are modified on the basis of a parameter for correcting image offset, individual correction images are generated, an integration value, for an entire screen, of an error amount, the error amount indicating a degree at which association in a parallax direction among the plurality of generated correction images is not possible, is calculated as an evaluation value, a parameter that is necessary for the association in the parallax direction among the parameters is changed, and the parameter is updated so that the evaluation value becomes a minimum.

The image processing apparatus according to an embodiment of the present disclosure may be an independent apparatus, and may also be a block that performs image processing.

According to an embodiment of the present disclosure, when a disparity image (depth image) is to be generated, it becomes possible to easily calibrate an error due to an offset between the image-capturing directions of cameras.

BRIEF DESCRIPTION OF THE DRAWING

FIG. 2 illustrates an input image and a depth image;

DETAILED DESCRIPTION OF EMBODIMENTS

Figure 1:
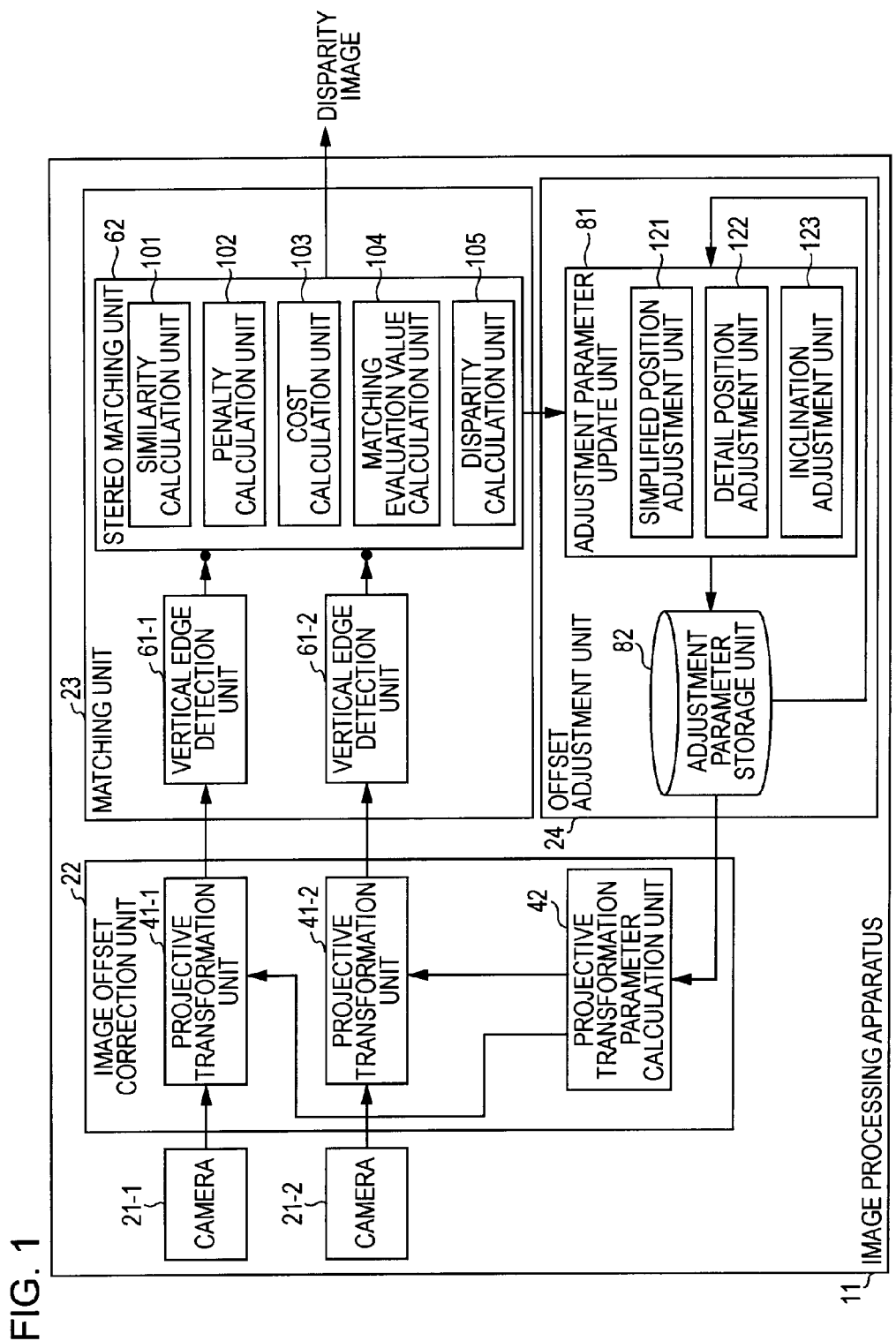
FIG. 1 is a block diagram illustrating an exemplary configuration of a first embodiment of an image processing apparatus to which the present disclosure is applied.

Hereinafter, modes for carrying out the disclosure (hereinafter referred to as embodiments) will be described. The description will be given in the following order.
1. First Embodiment (example of case in which calibration is performed using software program)
2. Second Embodiment (example of case in which calibration is performed by operating hardware)
3. Third Embodiment (example of performing another stereo matching process)
1. First Embodiment
Exemplary Configuration of Image Processing Apparatus FIG. 1 illustrates an exemplary configuration of an embodiment of hardware of an image processing apparatus to which the present disclosure is applied. An image processing apparatus 11 of FIG. 1 generates, from images that are captured by cameras 21-1 and 21-2, a disparity image (depth image) in which the pixel value of each pixel is made to be a value that is inversely proportional to the distance from the image-capturing position to a subject. That is, in a case where an image that is captured by the cameras 21-1 and 21-2 is an image P1 such as that shown in the upper area of FIG. 2, the image processing apparatus 11 generates a disparity image P2 such as that shown in the bottom area of FIG. 2. In the image P1 of FIG. 2, a person, a cloud, and the sun are contained in the image. In comparison, the disparity image P2 is such that the fingers of the left and right hands at a position closer to the image-capturing position on a side further toward the front than the physical main body of a person who is a subject in the image P1 is displayed so as to be brighter, and the physical main body farther than the fingers from the image-capturing position is made to be a darker color. Then, since the cloud and the sun, which are far from the physical body of the person who is a subject, are sufficiently far from the image-capturing position, they are made to be a darker color. Furthermore, when the image processing apparatus 11 generates a disparity image, the image processing apparatus 11 performs calibration so that an error of the disparity image, which occurs due to the offset between the image-capturing directions of the cameras 21-1 and 21-2 becomes a minimum.

Figure 3:
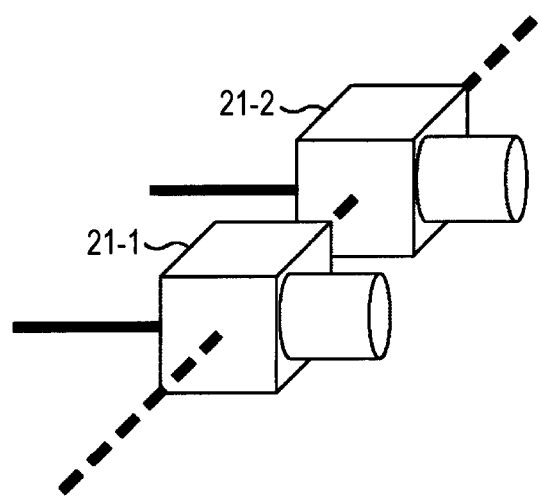
FIG. 3 illustrates the configuration of a camera.

More specifically, the image processing apparatus 11 includes the cameras 21-1 and 21-2, an image offset correction unit 22, a matching unit 23, and an offset adjustment unit 24. As shown in FIG. 3, for example, the cameras 21-1 and 21-2 are each set to capture an image of the same subject from the different left and right viewpoints, and each of the cameras 21-1 and 21-2 supplies the captured image to the image offset correction unit 22. It is sufficient for the cameras 21-1 and 21-2 to have a configuration capable of performing image capture from different viewpoints. Thus, rather than image capture being performed from the different left and right viewpoints as shown in FIG. 3, image capture may be performed from viewpoints that are different vertically. Furthermore, since it is sufficient that the cameras 21-1 and 21-2 have a configuration capable of performing image capture from a plurality of different viewpoints, images from two different viewpoints by two cameras is not necessary to be used, and a plurality of images that are captured from three or more viewpoints, may be used. However, in the following, the description will be given by assuming that two cameras 21-1 and 21-2 that perform image capture from different left and right viewpoints are used.

The image offset correction unit 22 corrects the images supplied from the cameras 21-1 and 21-2 on the basis of the parameter that is adjusted by the offset adjustment unit 24, and supplies individual correction images to the matching unit 23. In more detail, the image offset correction unit 22 includes projective transformation units 41-1 and 41-2, and a projective transformation parameter calculation unit 42. The projective transformation parameter calculation unit 42 calculates a projective transformation parameter on the basis of the adjustment parameter stored in an adjustment parameter storage unit 82 of the offset adjustment unit 24, and supplies the projective transformation parameter to the projective transformation units 41-1 and 41-2. The projective transformation units 41-1 and 41-2 generate correction images in which the pixel position of each pixel of the images that are supplied correspondingly from the cameras 21-1 and 21-2 is converted on the basis of the projective transformation parameter, and supply the correction images to the matching unit 23.

Figure 4:
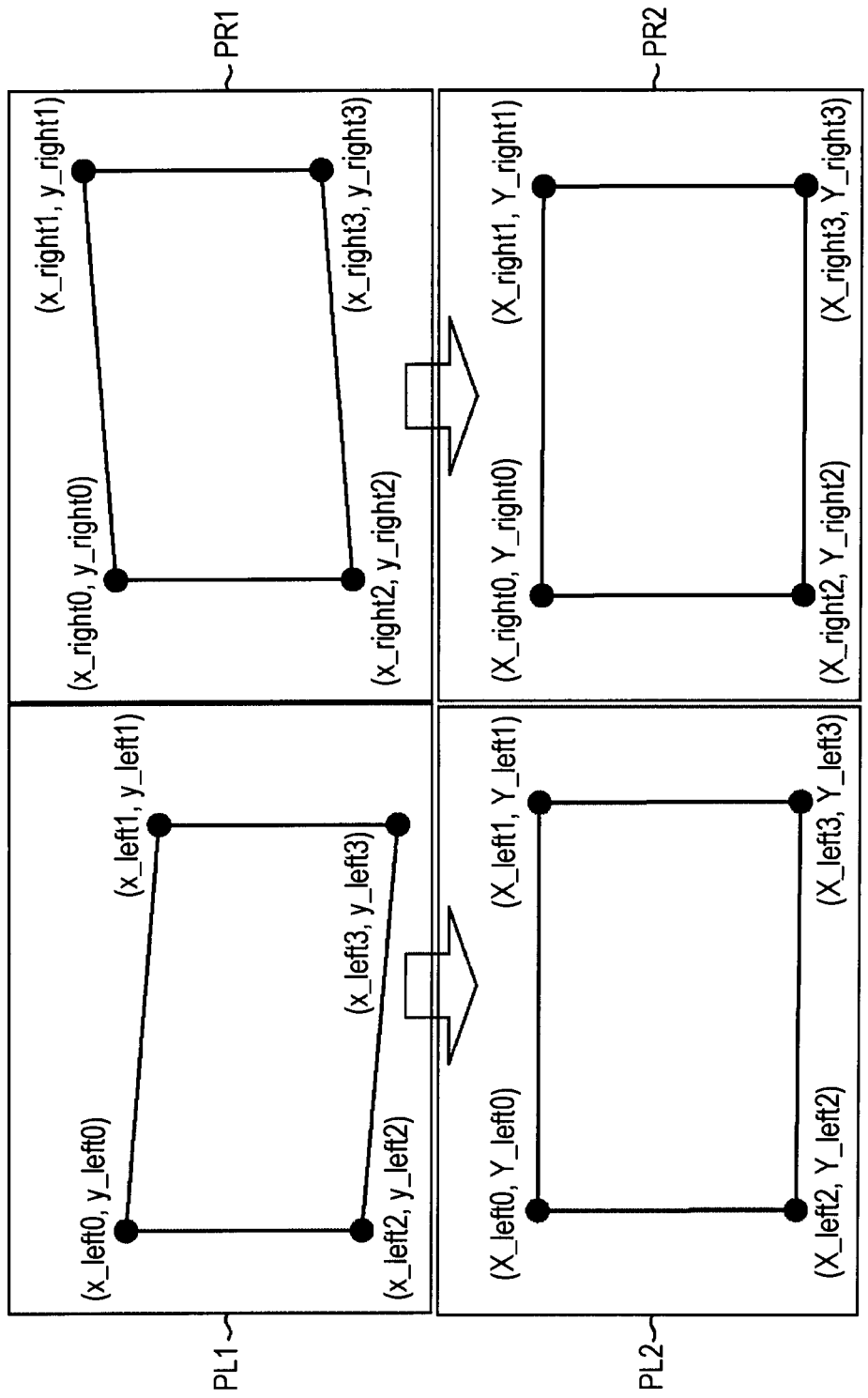
FIG. 4 illustrates the relationship of coordinates of an input image and a correction image.

Specifically, the projective transformation units 41-1 and 41-2 transform, for example, images PL1 and PR1 of FIG. 4 into images PL2 and PR2 of FIG. 4 in accordance with a projective transformation parameter. The image PL1 of FIG. 4 is an image captured by the camera 21-1, and the image PL2 indicates a correction image that is projectively transformed and corrected by the projective transformation unit 41-1. Furthermore, similarly, the image PR2 of FIG. 4 is an image captured by the camera 21-2, and the image PR2 indicates a correction image that is projectively transformed and corrected by the projective transformation unit 41-2. That is, the coordinates of the projective transformation destination, which correspond to the coordinates (x_left[n], y_left[n]) of the four apexes of the projective transformation source, are represented as (X_left[n], Y_left[n]). n is an identifier that identifies the four points of the apexes, and $0 \leq n < 3$.

The rectangle of the projective transformation destination is represented as in the following equations (1) to (4) by setting the horizontal pixel size of the camera image to W and the vertical pixel size thereof to H, for example, W=320 and H=240.

$$(X\_left[0], Y\_left[0]) = (BW, BH) \quad (1)$$

$$(X\_left[1], Y\_left[1]) = (W-BW, BH) \quad (2)$$

$$(X\_left[2], Y\_left[2]) = (BW, H-BH) \quad (3)$$

$$(X\_left[3], Y\_left[3]) = (W-BW, H-BH) \quad (4)$$

Here, BW and BH denote the number of pixels from the horizontal/vertical screen ends to the rectangle, for example, BW=64 and BH=64. In equations (1) to (4), transformation equations in an example in the case where the image PL1 is transformed into the image PL2 are basically the same as transformation equations of transforming the image PR1 into the image PR2. Thus, the description thereof is omitted.

Furthermore, the adjustment parameter is represented by (ΔX, ΔY, ΔS0, ΔY0, ΔS1, ΔY1), and is a parameter for performing projective transformation of each apex in the above-mentioned image in the shape of a rectangle.

Figure 5:
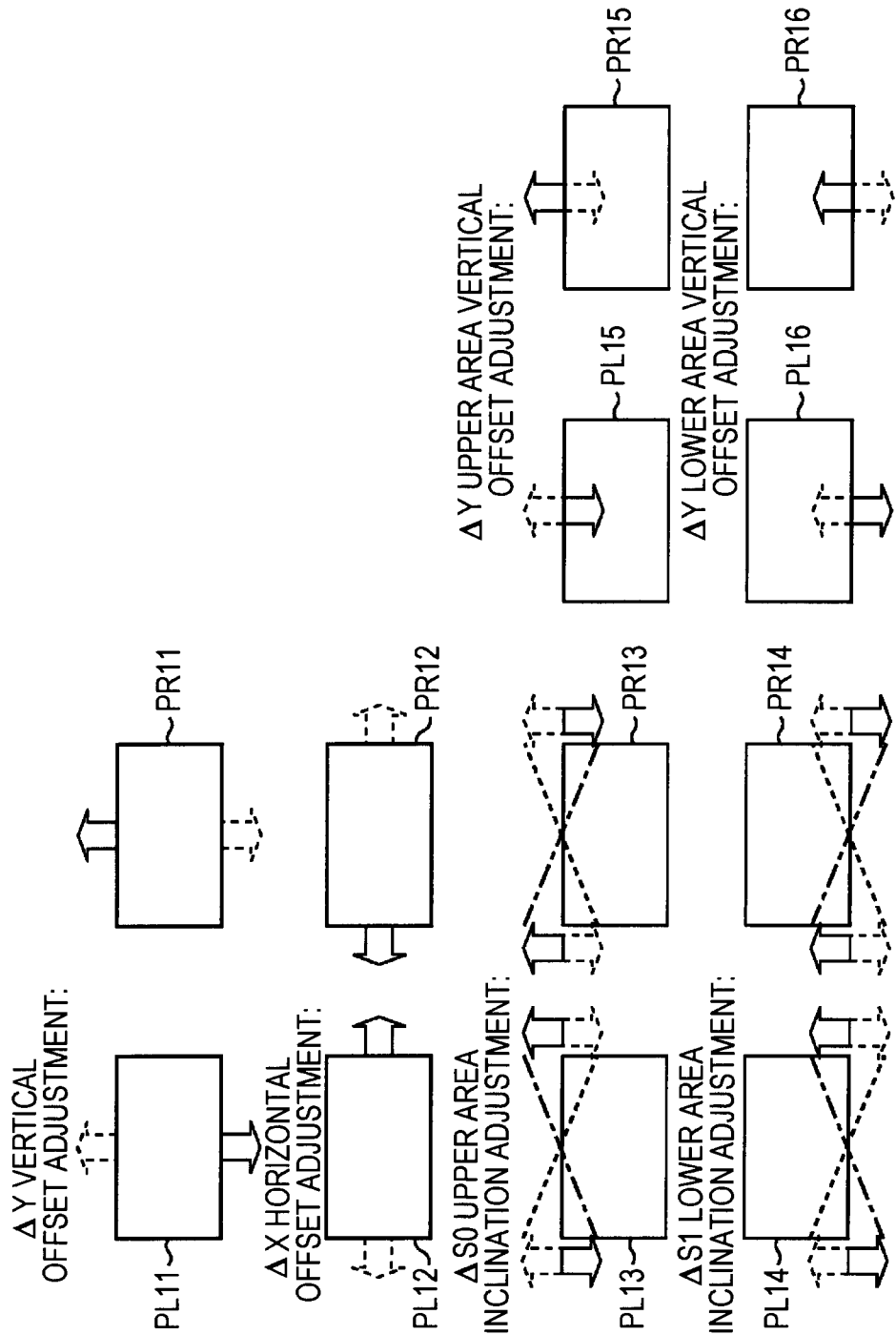
FIG. 5 illustrates parameters when an input image is corrected.

Among the adjustment parameters, ΔX and ΔY are parameters for correcting an offset between the camera images over the entire screen in the horizontal direction and in the vertical direction, respectively. For example, when offset is large in the positive direction, ΔY corresponds to making the reference rectangle of the projective transformation source move toward the lower side by ΔY as shown in an image PL11 of FIG. 5, or corresponds to making the reference rectangle of the projective transformation source move toward the upper area by ΔY as shown in an image PR11 of FIG. 5. It is possible for this parameter to correct for up and down offsets between left and right images by setting ΔY=n in a case where, for example, the left side of the input left and right camera images is deviated from an ideal state downward by n pixels in the entire image with respect to the right side. In a similar manner, ΔX is a parameter that corrects for left and right offsets, as shown in images PL12 and PR12 of FIG. 5.

The adjustment parameters ΔS0, ΔY0, ΔS1, and ΔY1 are parameters that cause the inclination of the upper area and the offset of the upper area in the vertical direction to match the inclination of the lower area and the offset of the lower area in the vertical direction. In stereo matching of two correction images, which will be described later, in general, if there is an offset in the vertical direction even a little (subpixel accuracy), matching will not succeed, and the offset will appear as an error. Accordingly, adjustments are performed separately with respect to the upper area and the lower area of the image. That is, the adjustment parameter ΔS0 is used to adjust the inclination of the upper area, as shown in images PL13 and PR13 of FIG. 5, and the adjustment parameter ΔS1 is used to adjust the inclination of the lower area, as shown in images PL14 and PR14 of FIG. 5. Furthermore, adjustments are performed separately between the upper area and the lower area of the image in such a manner that by using the adjustment parameter ΔY0, the offset of the upper area is adjusted as shown in images PL15 and PR15 of FIG. 5, and by using the adjustment parameter ΔY1, the offset of the lower area is adjusted as shown in images PL16 and PR16 of FIG. 5.

Then, the adjustment parameter (ΔX, ΔY, ΔS0, ΔS1, ΔY0, ΔY1) in the offset adjustment unit 24 has been adjusted so that an error in the disparity image in the matching unit 23 becomes a minimum. The coordinates (x_left[n], y_left[n]) of the four apexes of the projective transformation source will be represented as in the following equations (5) to (12) in accordance with these adjustment parameters (ΔX, ΔY, ΔS0, ΔS1, ΔY0, ΔY1) and the coordinates (X_left[n], Y_left[n]) of the projective transformation destination.

$$(x\_left[0], y\_left[0]) = (X\_left[0]+\Delta X, Y\_left[0]+\Delta Y+\Delta Y0+\Delta S0) \quad (5)$$

$$(x\_left[1], y\_left[1]) = (X\_left[1]+\Delta X, Y\_left[1]+\Delta Y+\Delta Y0-\Delta S0) \quad (6)$$

$$(x\_left[2], y\_left[2]) = (X\_left[2]+\Delta X, Y\_left[2]+\alpha Y+\Delta Y1+\Delta S1) \quad (7)$$

$$(x\_right[0], y\_right[0]) = (X\_right[0]-\Delta X, Y\_right[0]-\Delta Y+\Delta Y0-\Delta S0) \quad (9)$$

$$(x\_right[2], y\_right[2]) = (X\_right[2]-\Delta X, Y\_right[2]-\Delta Y+\Delta Y1-\Delta S1) \quad (11)$$

$$(x\_right[3], y\_right[3]) = (X\_right[3]-\Delta X, Y\_right[3]-\Delta Y+\Delta Y1+\Delta S1) \quad (12)$$

When the coordinates of the projective transformation source and the projection destination of left and right, which have been obtained as above, are substituted into (x, y) and (X, Y), respectively, as in the following, the coordinates can be expressed by the following equation (13) and equation (14) by using the projective transformation parameters a, b, c, d, e, f, g, and h.

$$x = \frac{aX + bY + c}{gX + hY + 1} \quad (13)$$

$$y = \frac{dX + eY + f}{gX + hY + 1} \quad (14)$$

The above-mentioned equations can be modified as in the following equation (15) when the coordinates (x, y) before projective transformation and the coordinates (X, Y) after projective transformation are denoted as $(x_n, y_n)$ and $(X_n, Y_n)$ (n is 0, 1, 2, or 3), respectively, and the projective transformation parameter is denoted as P=(a, b, c, d, e, f, g, h).

$$\begin{pmatrix} X_1 & y_1 & 1 & 0 & 0 & 0 & -x_1X_1 & -x_1X_1 \\ 0 & 0 & 0 & X_1 & y_1 & 1 & -x_1X_1 & -x_1X_1 \\ X_2 & y_2 & 1 & 0 & 0 & 0 & -x_2X_2 & -x_2X_2 \\ 0 & 0 & 0 & X_2 & y_2 & 1 & -x_2X_2 & -x_2X_2 \\ X_3 & y_3 & 1 & 0 & 0 & 0 & -x_3X_3 & -x_3X_3 \\ 0 & 0 & 0 & X_3 & y_3 & 1 & -x_3X_3 & -x_3X_3 \\ X_4 & y_4 & 1 & 0 & 0 & 0 & -x_4X_4 & -x_4X_4 \\ 0 & 0 & 0 & X_4 & y_4 & 1 & -x_4X_4 & -x_4X_4 \end{pmatrix} P^T = \begin{pmatrix} 1 \\ 1 \\ 1 \\ 1 \\ 1 \\ 1 \\ 1 \\ 1 \end{pmatrix} \quad (15)$$

By substituting the coordinates of x_left[n] and y_left[n] into $(x_n, y_n)$ of the above-mentioned equation (15), and by substituting X_left[n] and Y_left [n] into $(X_n, Y_n)$, projective transformation parameters P can be obtained as corresponding solutions of the simultaneous equation.

Hereinafter, projective transformation parameters P for the left image and the right image, which are obtained in the foregoing, are denoted as Pleft and Pright, respectively.

That is, on the basis of the projective transformation parameters Pleft and Pright, which are obtained in the manner described above, the projective transformation units 41-1 and 41-2 perform projective transformation processes in accordance with equation (13) and equation (14) on the images captured by the cameras 21-1 and 21-2, respectively, and generate correction images. Regarding the association of the pixel values in projective transformation, it is preferable that in order to suppress occurrence of aliasing, pixel interpolation using peripheral pixels in accordance with a bi-linear method, a bi-cubic method, or the like is performed.

The matching unit 23 generates a disparity image by using the images that are supplied from the image offset correction unit 22, the images being captured using the cameras 21-1 and 21-2 having different viewpoints, are corrected on the basis of the adjustment parameter. Furthermore, the matching unit 23 calculates a matching evaluation value that evaluates the error of the disparity image and supplies the matching evaluation value to the offset adjustment unit 24.

In more detail, the matching unit 23 includes vertical edge detection units 61-1 and 61-2, and a stereo matching unit 62. The vertical edge detection units 61-1 and 61-2 perform an edge detection filtering process on the correction images corresponding to the images captured by the cameras 21-1 and 21-2, respectively, so as to generate edge detection images, and supplies them to the stereo matching unit 62. The stereo matching unit 62 performs a stereo matching process by using the edge detection images corresponding to the images captured by the cameras 21-1 and 21-2 so as to generate a disparity image and also calculates a matching evaluation value that evaluates the error of the disparity image.

In more detail, the stereo matching unit 62 includes a similarity calculation unit 101, a penalty calculation unit 102, a cost calculation unit 103, a matching evaluation value calculation unit 104, and a disparity calculation unit 105. The similarity calculation unit 101 calculates the similarity of the two edge detection images. The penalty calculation unit 102 obtains, through calculations, a penalty with respect to a change in the disparity between adjacent pixels. The cost calculation unit 103 calculates a cost by adding the similarity for each line in the horizontal direction of two edge detection images, and the penalty. The matching evaluation value calculation unit 104 calculates, as a matching evaluation value error, the total sum of the cost for each of all the lines. The disparity calculation unit 105 obtains a disparity of each pixel when the cost is minimized, and outputs the disparity as a disparity image.

The offset adjustment unit 24 updates the adjustment parameter ($\Delta X$, $\Delta Y$, $\Delta S0$, $\Delta S1$, $\Delta Y0$, $\Delta Y1$) so that the matching evaluation value error becomes a minimum. In more detail, the offset adjustment unit 24 includes an adjustment parameter update unit 81 and an adjustment parameter storage unit 82. The adjustment parameter update unit 81 obtains a matching evaluation value error while the adjustment parameter ($\Delta X$, $\Delta Y$, $\Delta S0$, $\Delta Y0$, $\Delta S1$, $\Delta Y1$) is changed, updates the matching evaluation value error so that it becomes a minimum, and stores the matching evaluation value error in the adjustment parameter storage unit 82.

In more detail, the adjustment parameter update unit 81 includes a simplified position adjustment unit 121, a detailed position adjustment unit 122, and an inclination adjustment unit 123. The simplified position adjustment unit 121 changes the adjustment parameter ($\Delta X$, $\Delta Y$) that is a parameter of the parallax in the search direction among the adjustment parameters at comparatively coarse intervals of pixels with respect to the entire range of the image, and adjusts the adjustment parameter ($\Delta X$, $\Delta Y$) so that the matching evaluation value error becomes minimized. The detailed position adjustment unit 122 changes the interval between pixels while gradually decreasing the interval in the vicinity of the adjustment parameter ($\Delta X$, $\Delta Y$) obtained by the simplified position adjustment unit 121, and adjusts in detail the adjustment parameter ($\Delta X$, $\Delta Y$) so that the matching evaluation value error becomes a minimum. The inclination adjustment unit 123 adjusts the adjustment parameter ($\Delta S0$, $\Delta Y0$, $\Delta S1$, $\Delta Y1$) so that the matching evaluation value error becomes a minimum by repeatedly decreasing the interval of the change gradually in the adjustment parameter ($\Delta S0$, $\Delta Y0$, $\Delta S1$, $\Delta Y1$) that is a parameter in a direction perpendicular to the search direction of the parallax from among the adjustment parameters in the order of the adjustment parameter $\Delta S0 \rightarrow \Delta Y0 \rightarrow \Delta S1 \rightarrow \Delta Y1 \rightarrow \ldots$.

That is, in the image processing apparatus 11, by using the adjustment parameter adjusted by the offset adjustment unit 24, the image offset correction unit 22 corrects the images that are captured by the cameras 21-1 and 21-2, and supplies them as correction images to the matching unit 23. Then, the matching unit 23 generates a disparity image by performing a stereo matching process on the basis of the two correction images and also calculates a matching evaluation value error. The offset adjustment unit 24 updates the adjustment parameter so that the matching evaluation value error is minimized. As a result of this series of processes being repeated, when the matching evaluation value error becomes a minimum, the adjustment parameter converges, and the calibration is completed. In the following, it becomes possible to generate a disparity image with high accuracy.

Calibration Process

Next, a description will be given, with reference to the flowchart of FIG. 6, of a calibration process.

In step S1, the adjustment parameter update unit 81 of the offset adjustment unit 24 initializes a base adjustment amount ($\Delta X$base, $\Delta Y$base, $\Delta S0$base, $\Delta Y0$base, $\Delta S1$base, $\Delta Y1$base), which serves as a reference for the adjustment parameter ($\Delta X$, $\Delta Y$, $\Delta S0$, $\Delta Y0$, $\Delta S1$, $\Delta Y1$), to one of the values that can be taken as an adjustment parameter. Examples of values that are initialized include a minimum value and a maximum value in the range that can be taken as an adjustment parameter.

In step S2, the adjustment parameter update unit 81 controls the simplified position adjustment unit 121 so as to perform a simplified position adjustment process, and obtains a coarse adjustment parameter ($\Delta X$, $\Delta Y$) in which the matching evaluation value error is decreased in a simplified manner.

Simplified Position Adjustment Process

Here, a description will be given below, with reference to the flowchart of FIG. 7, of a simplified position adjustment process.

In step S21, the simplified position adjustment unit 121 defines an error minimum value error_min, initializes it, and also initializes the adjustment variables $\Delta X'$, $\Delta Y'$, $\Delta S0'$, $\Delta Y0'$, $\Delta S1'$, and $\Delta Y1'$ of $\Delta X$, $\Delta Y$, $\Delta S0$, $\Delta Y0$, $\Delta S1$, and $\Delta Y1$, which are adjustment parameters. More specifically, the simplified position adjustment unit 121 may substitute a maximum value that is considered as an error minimum value error_min, and may set, for example, the error minimum value error_min=0xffffffff. In the simplified position adjustment process, since only $\Delta X$ and $\Delta Y$ among the adjustment parameters are handled, if only these adjustment parameters are initialized, the other values are only necessary to be set to predetermined values.

In step S22, the simplified position adjustment unit 121 calculates and updates the adjustment parameter ($\Delta X$, $\Delta Y$, $\Delta S0$, $\Delta Y0$, $\Delta S1$, $\Delta Y1$) by using an adjustment variable ($\Delta X'$, $\Delta Y'$, $\Delta S0'$, $\Delta Y0'$, $\Delta S1'$, $\Delta Y1'$), and stores the adjustment parameter in the adjustment parameter storage unit 82. That is, the simplified position adjustment unit 121 calculates and updates ($\Delta X = \Delta X$base$+\Delta X'$, $\Delta Y = \Delta Y$base$+\Delta Y'$, $\Delta S0 = \Delta S0$base$+\Delta S0'$, $\Delta Y0 = \Delta Y0$base$+\Delta Y0'$, $\Delta S1 = \Delta S1$base$+\Delta S1'$, $\Delta Y1 = \Delta Y1$base$+\Delta Y1'$) by adding the value of the adjustment variable to the base adjustment amount with regard to each of the adjustment parameters. Here, ($\Delta X$base, $\Delta Y$base, $\Delta S0$base, $\Delta Y0$base, $\Delta S1$base, $\Delta Y1$base) is the base adjustment amount of the adjustment parameter ($\Delta X$, $\Delta Y$, $\Delta S0$, $\Delta Y0$, $\Delta S1$, $\Delta Y1$), respectively.

In step S23, the projective transformation parameter calculation unit 42 of the image offset correction unit 22 reads the adjustment parameter ($\Delta X$, $\Delta Y$, $\Delta S0$, $\Delta Y0$, $\Delta S1$, $\Delta Y1$) stored in the adjustment parameter storage unit 82, calculates the projective transformation parameter P in accordance with equation (13) and equation (14) above, and supplies them to the projective transformation units 41-1 and 41-2.

In step S24, the projective transformation units 41-1 and 41-2 projectively transform the images supplied from the cameras 21-1 and 21-2 on the basis of the projective transformation parameter P, thereby generating correction images, and supply them to the matching unit 23.

In step S25, the vertical edge detection units 61-1 and 61-2 of the matching unit 23 perform processing on the correction images supplied from the projective transformation units 41-1 and 41-2 of the image offset correction unit 22 by using a vertical edge detection filter, and detect vertical edges. Then, the vertical edge detection units 61-1 and 61-2 supply the edge detection images formed of respectively detected vertical edges to the stereo matching unit 62.

In more detail, the vertical edge detection units 61-1 and 61-2 generate edge images, in which extraction of edge information in the horizontal direction, which is necessary in stereo matching is performed, in order to eliminate an influence on the difference between left and right, due to offset components of direct current (DC) of the correction images such that the input images, which are captured by the cameras 21-1 and 21-2, have been corrected by the image offset correction unit 22. When each pixel of the input correction image is made to be a pixel of interest, the vertical edge detection units 61-1 and 61-2 perform processing using a Sobel filter in the shape of a square of 3×3 pixels with the pixel of interest being the center. More specifically, the vertical edge detection units 61-1 and 61-2 perform a computation, through a computation shown by the following equation (16), by setting the luminance value of the pixel of interest of the input image as g(x, y) and the luminance value of the output image as f(x, y).

$$f(x, y) = \sum_{j=0,1,2} \sum_{i=0,1,2} \{g(x+i-1, y+j-1) \times h(i, j)\} \quad (16)$$

Here, h is, for example, a matrix expression that indicates a Sobel filter shown by the following equation (17).

$$h = \begin{pmatrix} -1 & 0 & +1 \\ -2 & 0 & +2 \\ -1 & 0 & +1 \end{pmatrix} \quad (17)$$

In step S26, the stereo matching unit 62 performs a stereo matching process by using the edge detection images corresponding to the supplied images captured by the cameras 21-1 and 21-2, thereby calculating a matching evaluation value error and generating a disparity image.

Stereo Matching Process

Figure 8:
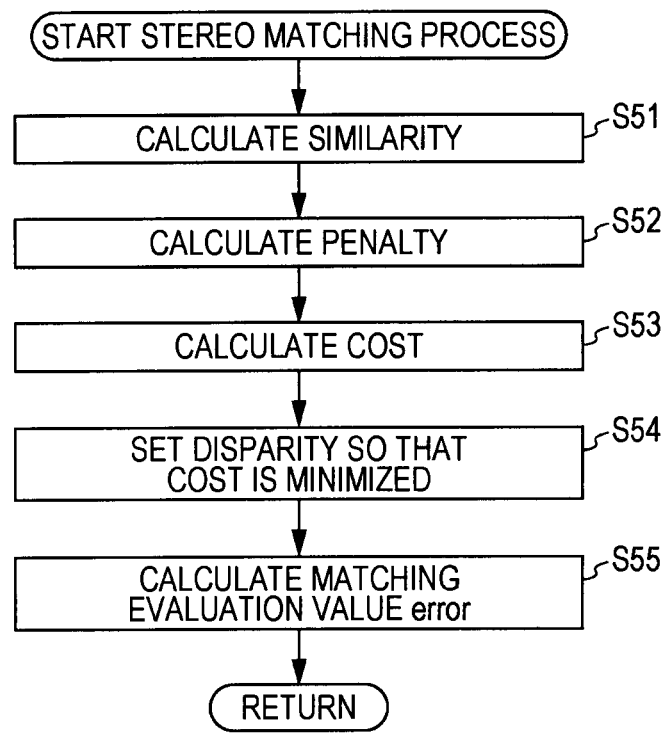
FIG. 8 is a flowchart illustrating a stereo matching process performed by the image processing apparatus of FIG. 1.

Here, a description will be given, with reference to the flowchart of FIG. 8, of a stereo matching process.

Here, an example will be described in which disparity up to the corresponding point of the right image among the images captured by the cameras 21-1 and 21-2 is obtained when the left image is used as a reference. Furthermore, the left image is denoted as p(x, y) and the right image as q(x, y), and disparity to be obtained is set as disparity(x, y) (0≤disparity(x, y)≤d_max). d_max is the maximum value of the disparity to be obtained, for example, d_max=63.

In step S51, the similarity calculation unit 101 calculates similarity(x, y, d) indicating the similarity between left and right images in accordance with the following equation (18).

$$\text{similarity}(x, y, d) = \sum_{i=-1,0,1} \sum_{j=-1,0,1} \text{ABS}(p(x+i, y+i) - q(x+d+i, y+j)) \quad (18)$$

In equation (18) that obtains the similarity(x, y, d), an example is shown in which the difference absolute value sum (SAD) of a luminance difference of a block area of 3×3 pixels is used. However, the block size is not limited to this block size. Furthermore, when the similarity(x, y, d) is to be obtained, a calculation using a difference sum of squares (SSD) or the like rather than a difference absolute value sum (SAD) may be performed, where d is the offset amount in the horizontal direction.

In step S52, the penalty calculation unit 102 calculates a penalty of adding a constraint such that disparity(x, y) is smoothly changed. In more detail, when disparity values of adjacent pixels in the horizontal direction are denoted as d0 and d1, the penalty calculation unit 102 defines them as in the following equation (19).

$$\text{penalty}(d_0, d_1) = \lambda \times |d_0 - d_1| \quad (19)$$

Here, λ is the weight that changes penalty in proportion to the absolute value of the change amount of the disparity, for example, λ=5. Equation (19) is not necessary to be a proportion equation, and is only necessary to be a function that increases in accordance with the change amount of the disparity(x, y).

In step S53, the cost calculation unit 103 calculates, in accordance with the following equation (20), a cost function when penalty(d0, d1) regarding the similarity(x, y, d) between left and right images and the continuity of the disparity value is added for each line (y=0) from x=0 to x=W−1.

$$\text{cost}_{min}(x, y) = \quad (20)$$
$$\begin{cases} \text{When } x > 0: & \text{similarity}(x, \text{disparity}(x, y)) + \min_{0 \le d \le \min(d+1, d_{max})} \\ & \{\text{penalty}(\text{disparity}(x, y), d) + \text{cost}_{min}(x-1, y)\} \\ \text{When } x = 0: & \text{similarity}(x, \text{disparity}(x, y)) \end{cases}$$

In step S54, the disparity calculation unit 105 calculates equation (20) so as to calculate disparity. In more detail, in a case where, for example, disparity from x=0 to x=W−1 is to be obtained, the disparity calculation unit 105 obtains disparity(x, y) of each pixel by minimizing cost_min (W−1, y). This minimizing calculation can be realized with a comparatively small number of computations by using dynamic programming. Such an example of using dynamic programming similarly to the foregoing for the purpose of calculating disparity of stereo matching is widely popular at the present time. For stereo matching using dynamic programming, reference should be made to, for example, Yuichi Ohta, Takeo Kanade Stereo by Intra- and Inter-Scanline Search Using Dynamic Programming IEEE Transactions on Pattern Analysis and Machine Intelligence, 1985.

There are various techniques for the definition of a cost function. However, the cost function is not limited to the above. Another technique may be used as long as the cost function is a function in which the cost increases in response to the error amount as a result of the stereo matching process.

In step S55, as shown in equation (21) below, the matching evaluation value calculation unit 104 calculates, as an evaluation value error in the matching process, the total sum of cost_minx, y) shown by equation (20) above in all the lines, and supplies the evaluation value error to the offset adjustment unit 24.

$$\text{error} = \sum_{y=0}^{H-1} cost_{min}(W-1, y) \quad (21)$$

However, an image end portion has little statistically correct information due to loss of a corresponding point. Therefore, the sum of the similarity and the penalty amount in units of pixels may be obtained, the total sum thereof may be obtained while weighting is performed over the entire screen, and the total sum may be made to be an evaluation value.

That is, the cost(x, y) in units of pixels is represented as in the following equation (22).

$$\text{cost}(x, y) = \text{similarity}(x, \text{disparity}(x, y)) + \text{penalty}(\text{disparity}(x, y), \text{disparity}(x-1, y)) \quad (22)$$

Accordingly, the matching evaluation value calculation unit 104 performs weighting on the cost(x, y) represented by equation (22) so that the contribution made by the screen end portion decreases. In addition, by performing integration, a calculation may be performed as shown in equation (23) below. As a result of the above, it becomes possible for the matching evaluation value calculation unit 104 to calculate a matching evaluation value in which the contribution made by the image end portion as a result of weighting is decreased.

$$\text{error}_{weighted} = \sum_{y=0}^{H-1} \text{weight}\left(\frac{y}{H}\right)\left\{\sum_{x=0}^{W-1} \text{weight}\left(\frac{x}{W}\right) \times \text{cost}(x, y)\right\} \quad (23)$$

Here, weight(a) is a weighting function, and, for example, may be made to be a function as shown in equation (24) below.

$$\text{weight}(a) = \begin{cases} \text{When } 0 < a < 0.1: & \sin\left(\frac{\pi}{2} \times 10.0a\right) \\ \text{When } 0.1 < a < 0.9: & 1.0 \\ \text{When } 0.9 < a < 1: & \sin\left(\frac{\pi}{2} \times 10.0(1.0-a)\right) \\ \text{When otherwise:} & 0.0 \end{cases} \quad (24)$$

Here, a of the argument denotes the position (x, y) of the effective pixel from 0 to 1.0 along the horizontal or vertical axis. The weighting method may be another function as long as the function is such that the contribution made by the end portion decreases.

In the foregoing, an example of obtaining a result of stereo matching that obtains a correspondence for a right image by using the left image as a reference has been described. In a similar manner, it is possible to obtain a correspondence for the left image by using the right image as a reference. Therefore, by using these, the matching evaluation value calculation unit 104 denotes matching evaluation values in which left and right are used as a reference as error_left_base and error_right_base, respectively, defines the sum of those values as shown in equation (25) below, and may take the sum to be a matching evaluation value. As a result of performing stereo matching in which left and right are used as references as described above, evaluation values of area (occlusion) portions for which dead zones are formed with respect to each other and reference is difficult to be made can be added together. Consequently, it becomes possible to further improve characteristics as evaluation values.

$$\text{error\_dual} = \text{error\_left\_base} + \text{error\_right\_base} \quad (25)$$

Figure 7:
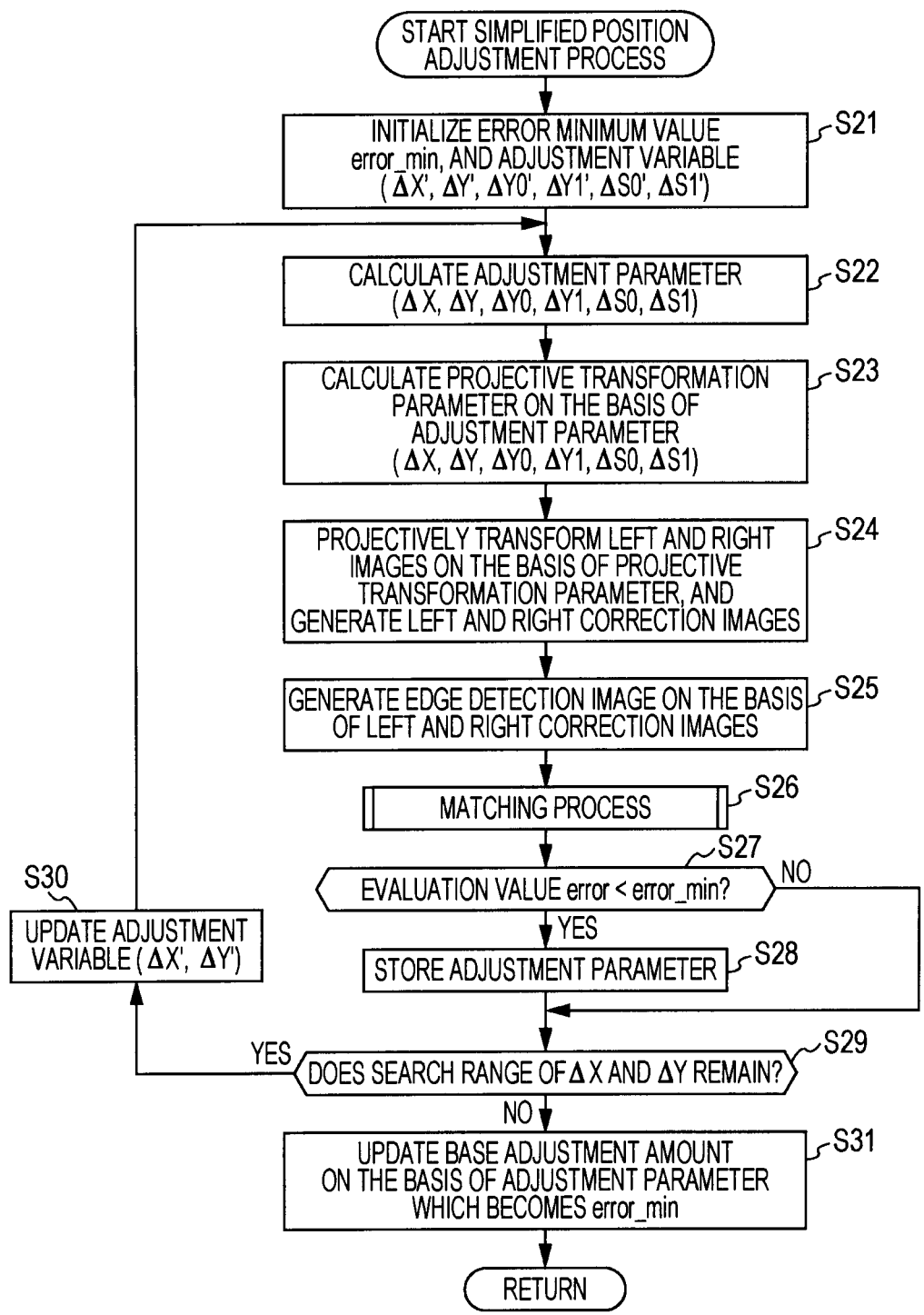
FIG. 7 is a flowchart illustrating a simplified position adjustment process performed by the image processing apparatus of FIG. 1.

Here, the description returns to the flowchart of FIG. 7.

In step S27, the simplified position adjustment unit 121 of the adjustment parameter update unit 81 in the offset adjustment unit 24 determines whether or not the obtained matching evaluation value error is smaller than an error minimum value error_min at this moment. In step S27, when the matching evaluation value error is smaller than the error minimum value error_min, it is assumed that the minimum value has been updated, and the process proceeds to step S28.

In step S28, the simplified position adjustment unit 121 stores the adjustment parameter (ΔX, ΔY, ΔS0, ΔY0, ΔS1, ΔY1) at this time as a minimum value (ΔXmin, ΔYmin, ΔS0min, ΔY0min, ΔS1 min, ΔY1min) of the adjustment parameter. At this time, the simplified position adjustment unit 121 updates the error minimum value error_min to the matching evaluation value error at this moment.

On the other hand, in step S27, when the matching evaluation value error is not smaller than the error minimum value error_min, the process of step S28 is skipped.

In step S29, the simplified position adjustment unit 121 determines whether or not an unprocessed search range from within the search range of the minimum value of the matching evaluation value error remains, the matching evaluation value being defined by ΔX' and ΔY' among the adjustment variables. The search range of the adjustment variables ΔX', ΔY', ΔS0', ΔY0', ΔS1', and ΔY1' will be represented as ΔX'min to ΔX'max, ΔY'min to ΔY'max, ΔS0'min to ΔS0'max, ΔY0'min to ΔY0'max, ΔS1'min to ΔS1'max, and ΔY1'min to ΔY1'max, respectively. Therefore, the search ranges of the adjustment variables ΔX', ΔY', ΔS0', ΔY0', ΔS1', and ΔY1' are defined as ΔX'min≤ΔX'≤ΔX'max, ΔY'min≤ΔY'≤ΔY'max, ΔS0'min≤ΔS0'≤ΔX'max, ΔY0'min≤ΔY0'≤Y0'max, ΔS1'min≤ΔS1'ΔX'max, and ΔY1'min≤ΔY1'≤Y1'max, respectively.

When it is determined in step S29 that the search range remains, in step S30, the simplified position adjustment unit 121 updates the adjustment variable (ΔX', ΔY') to the unprocessed search range, and the process returns to step S22.

Figure 9:
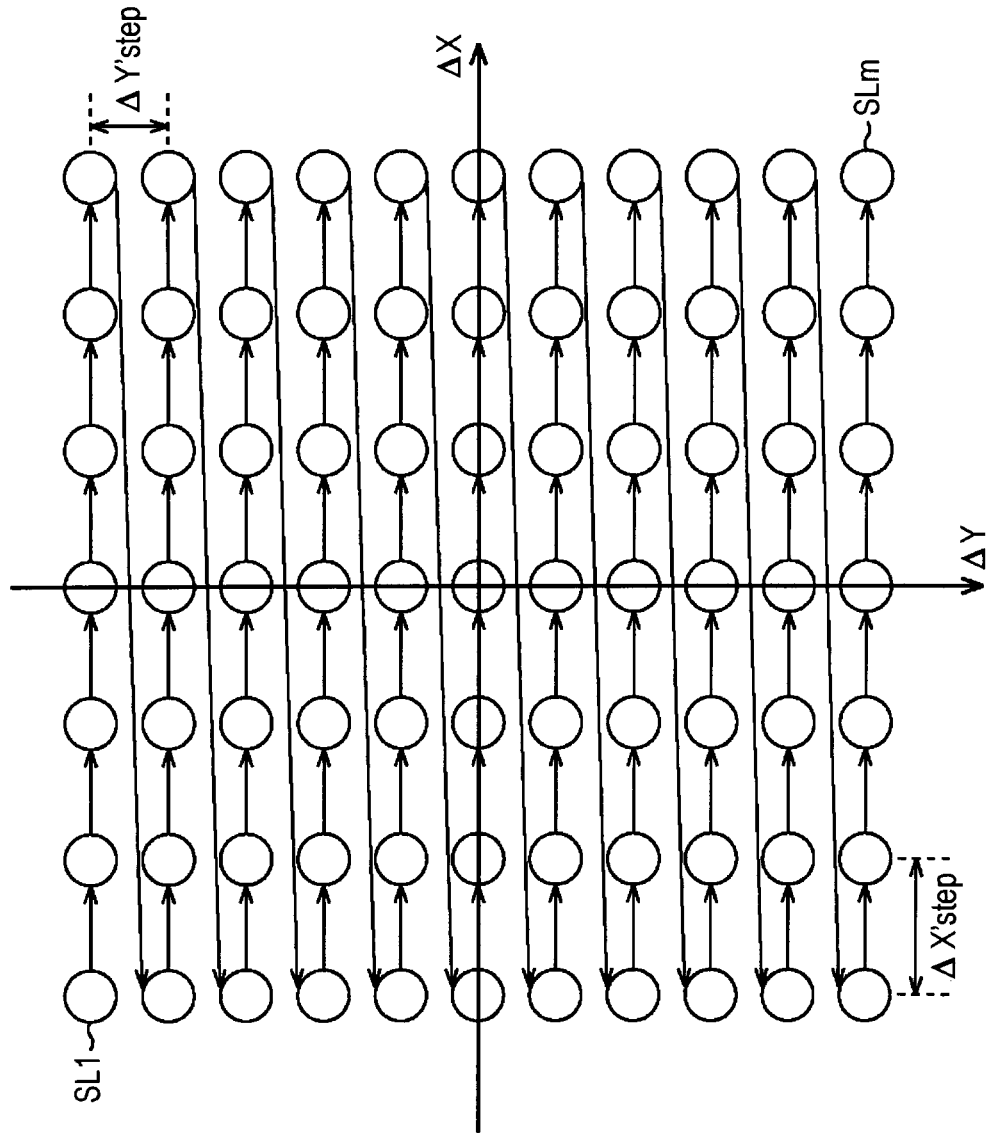
FIG. 9 illustrates a simplified position adjustment process.

That is, for example, in the case where a pixel to be searched for in the search range is defined as shown in FIG. 9, a pixel SL1 indicated by a circle mark in the left upper area in the figure through to a pixel SLm are sequentially set in the order of the arrow. At this time, if the search intervals of the search variables ΔX' and ΔY' are denoted as ΔX'step and ΔY'step, in ΔX'min to ΔX'max, the search interval is sequentially updated in accordance with ΔX'=ΔX'+ΔX'step. When X'max is reached, the search interval is updated in accordance with ΔY'=ΔY'+ΔY'step, it is set that ΔX'=ΔX'min, identical processing is repeated in the range of ΔY'min to ΔY'max, and the processing is completed when X'=X'max and Y'=Y'max.

Then, when it is determined in step S29 that the search range does not remain, the process proceeds to step S31.

In step S31, the simplified position adjustment unit 121 updates the base adjustment amount (ΔXbase, ΔYbase, ΔS0base, ΔY0base, ΔS1base, ΔY1base) on the basis of the minimum value (ΔXmin, ΔYmin, ΔS0min, ΔY0min, ΔS1min, ΔY1min) of the adjustment parameter in the error minimum value error_min. That is, the simplified position adjustment unit 121 sets the base adjustment amount (ΔXbase, ΔYbase) to the minimum value (ΔXmin, ΔYmin) of the adjustment parameter in the error minimum value error_min, and the processing is completed.

That is, as a result of the above processing, over the entire range of the image, it becomes possible to obtain a rough position, which becomes the adjustment parameter (ΔX, ΔY) for which the matching evaluation value error becomes a minimum, as a base adjustment amount (ΔXbase, ΔYbase).

Figure 6:
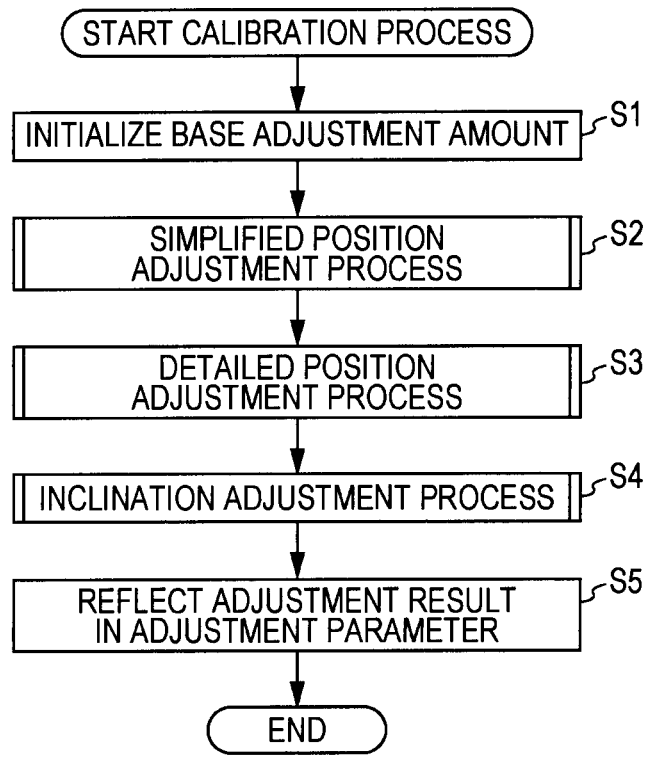
FIG. 6 is a flowchart illustrating a calibration process performed by the image processing apparatus of FIG. 1.

Here, the description returns to the flowchart of FIG. 6.

In step S3, the detailed position adjustment unit 122 of the adjustment parameter update unit 81 performs a detailed position adjustment process on the basis of the overall adjustment parameter (ΔX, ΔY) that is obtained in a simplified manner in the simplified position adjustment process and, in more detail, obtains an overall adjustment parameter (ΔX, ΔY) for which the matching evaluation value error becomes a minimum.

Detailed Position Adjustment Process

Figure 10:
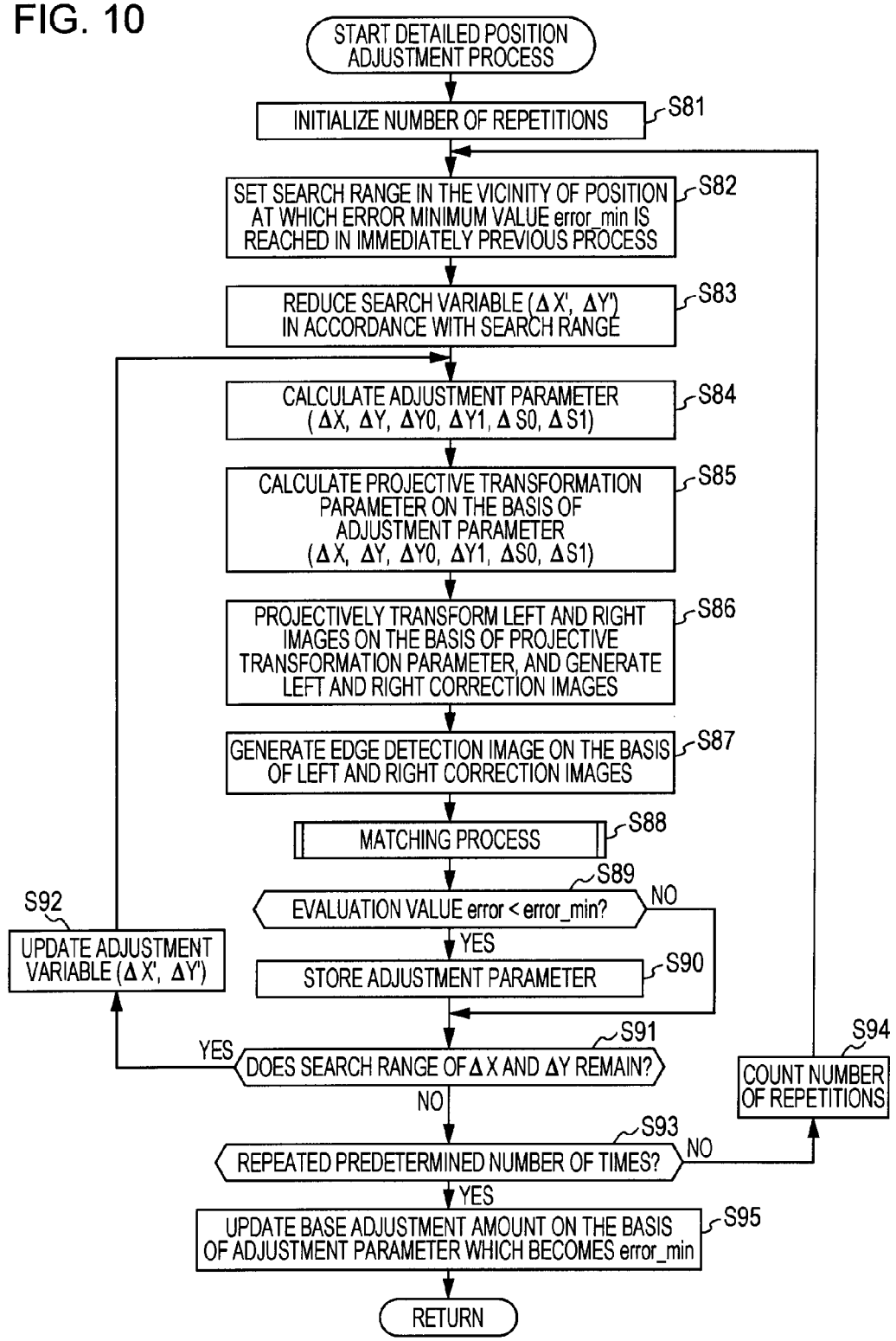
FIG. 10 is a flowchart illustrating a detailed position adjustment process performed by the image processing apparatus of FIG. 1.

Here, a description will be given, with reference to the flowchart of FIG. 10, of a detailed position adjustment process.

In step S81, the detailed position adjustment unit 122 initializes a counter r that counts a number of repetitions, which will be described later.

In step S82, the detailed position adjustment unit 122 sets a search range that is reduced to the vicinity of the adjustment parameter (ΔX, ΔY) in which the error minimum value error_min is reached in the immediately previous process.

In step S83, the detailed position adjustment unit 122 reduces the search interval of the search variables ΔX' and ΔY' in association with the search range.

Figure 11:
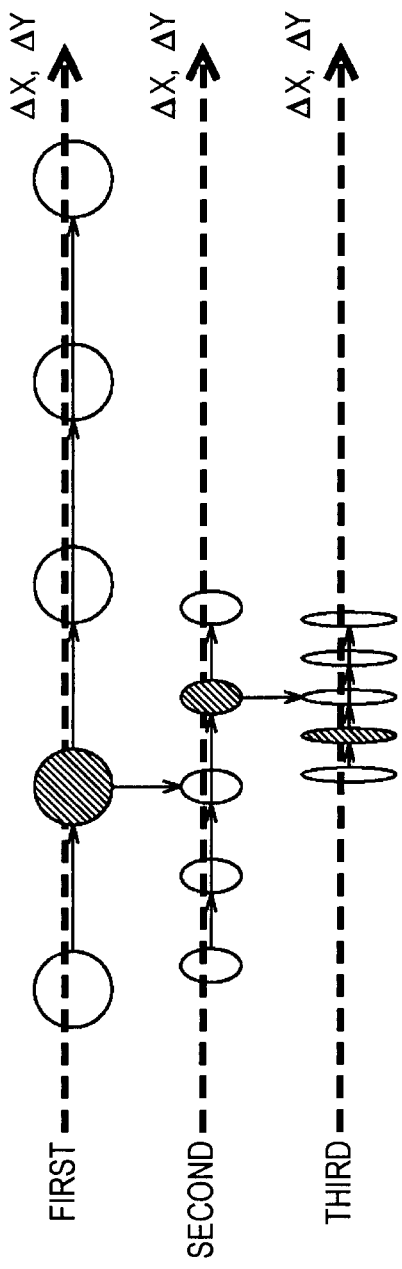
FIG. 11 illustrates a detailed position adjustment process.

That is, in the search range of each pixel indicated by the circle mark in the upper stage of FIG. 11, in the case where a pixel indicated by a shaded circle mark indicates an adjustment parameter ΔX or ΔY that becomes the error minimum value error_min in a first process, in a second process, as circle marks in the middle stage of FIG. 11 indicate, the detailed position adjustment unit 122 decreases the interval (ΔX'step or ΔY'step) of the search pixel, and further sets the range in the vicinity of the pixel obtained in the first process as a search range. Similarly, in the search range of each pixel indicated by the circle mark of the middle stage in FIG. 11, in the case where the pixel of a shaded circle mark indicates the adjustment parameter ΔX or ΔY in which the error minimum value error_min is reached in the second process, in a third process, as indicated by circle marks of the lower stage in FIG. 11, the detailed position adjustment unit 122 further decreases the interval (ΔX'step or ΔY'step) of the search pixel, and sets the range in the vicinity of the pixel that is searched for at the second time as a search range.

The processing of steps S84 to S92 is the same as the processing of steps S22 to S30 of FIG. 7. Thus, the description thereof is omitted.

That is, as a result of the processing of steps S84 to S92, when the search range and the change in the search variables are reduced, and the adjustment parameter (ΔX, ΔY) in which the matching evaluation value error becomes the error minimum value error_min is obtained, the process proceeds to step S93.

In step S93, the detailed position adjustment unit 122 determines whether or not the counter r of the number of repetitions has become a predetermined number of times, the search range and the change in the search variables are reduced by a predetermined number of times, and the adjustment parameter (ΔX, ΔY) in which the matching evaluation value error becomes the error minimum value error_min has been obtained. When it is determined in step S93 that, for example, the number of repetitions is not a predetermined number of times, in step S94, the detailed position adjustment unit 122 increments the counter r by 1, and the process returns to step S82. That is, the processing of steps S82 to S94 is repeated the predetermined number of times. Then, when it is determined in step S93 that the processing has been repeated the predetermined number of times, the process proceeds to step S95.

In step S95, the detailed position adjustment unit 122 updates the base adjustment amount (ΔXbase, ΔYbase, ΔS0base, ΔY0base, ΔS1base, ΔY1base) on the basis of the minimum value (ΔXmin, ΔYmin, ΔS0min, ΔY0min, ΔS1min, ΔY1min) of the adjustment parameter in the error minimum value error_min. That is, the detailed position adjustment unit 122 sets the base adjustment amount (ΔXbase, ΔYbase) as the minimum value (ΔXmin, ΔYmin) of the adjustment parameter in the error minimum value error_min, and the processing is completed.

That is, as a result of the above processing, in the range in the vicinity in which the base adjustment amount (ΔXbase, ΔYbase) has been obtained as the rough position, processing in which the search range and the change in the search variables are reduced the predetermined number of times, and the adjustment parameter (ΔX, ΔY) in which the matching evaluation value error becomes the error minimum value error_min is obtained is repeated. As a result, the adjustment parameter (ΔX, ΔY) in which the matching evaluation value error becomes the error minimum value error_min is obtained in detail, making it possible to store the adjustment parameter as the base adjustment amount (ΔXbase, ΔYbase).

Here, the description returns to the flowchart of FIG. 6.

When the adjustment parameter (ΔX, ΔY) is obtained in detail in the detailed position adjustment process of step S3, the process proceeds to step S4.

In step S4, the inclination adjustment unit 123 performs an inclination adjustment process so as to obtain the adjustment parameter (ΔS0, ΔY0, ΔS1, ΔY1) in which the matching evaluation value error becomes the error minimum value error_min.

Inclination Adjustment Process

Figure 12:
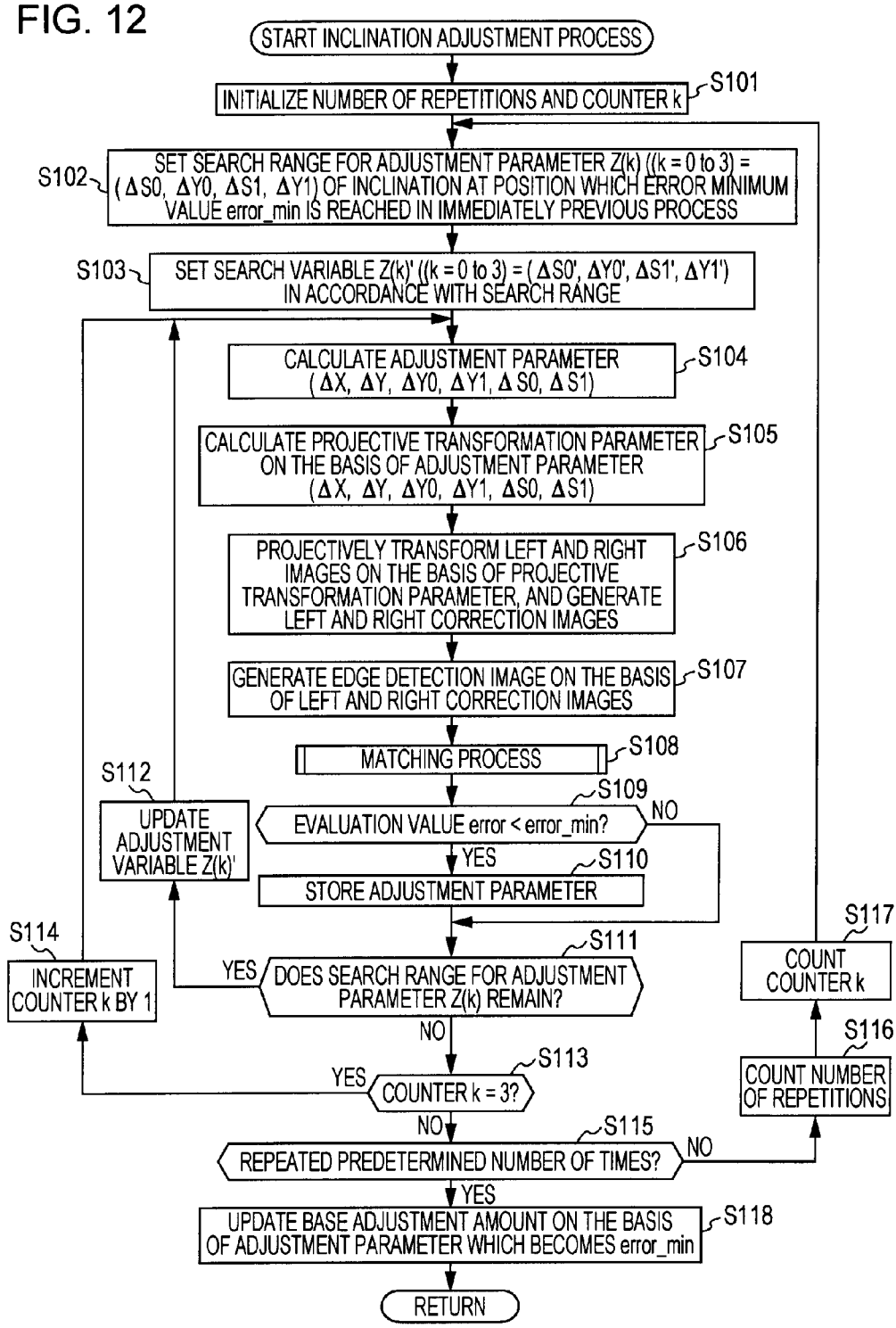
FIG. 12 is a flowchart illustrating an inclination adjustment process performed by the image processing apparatus of FIG. 1.

Here, a description will be given, with reference to the flowchart of FIG. 12, of an inclination adjustment process.

In step S101, the inclination adjustment unit 123 initializes the counter r that counts a number of repetitions, and a counter k that identifies an adjustment parameter, which will be described later, to 0.

In step S102, the inclination adjustment unit 123 sets the search range that is reduced to the vicinity of the adjustment parameter Z(k) (k=0 to 3) (=(ΔS0, ΔY0, ΔS1, ΔY1)) that becomes the error minimum value error_min in the immediately previous process. Here, the adjustment parameter (ΔS0, ΔY0, ΔS1, ΔY1) is represented by the adjustment parameter Z(k) (k=0 to 3) by using the counter k. That is, the adjustment parameter Z(0) is an adjustment parameter ΔS0. The adjustment parameter Z(1) is an adjustment parameter ΔY0. The adjustment parameter Z(2) is an adjustment parameter ΔS1. The adjustment parameter Z(3) is an adjustment parameter ΔY1. Furthermore, the search range is set with respect to each of the adjustment parameters, and in the first process, the search range may be the entire range of the values that can be taken.

In step S103, the inclination adjustment unit 123 sets the search interval of the search variables ΔS0', ΔY0', ΔS1', and ΔY1' in association with the search range. That is, similarly to the case in which the search interval of the above-mentioned search range ΔX' and ΔY' has been set, the search interval is reduced and set in association with the search range and the number of repetitions.

The processing of steps S104 to S112 is the same as the processing of steps S22 to S30 of FIG. 7. Thus, the description thereof is omitted.

That is, as a result of the processing of steps S104 to S112, when the search range and the change in the search variables are reduced, and the adjustment parameter Z(k) in which the matching evaluation value error becomes the error minimum value error_min is obtained, the process proceeds to step S113.

In step S113, the inclination adjustment unit 123 determines whether or not the counter k is 3. When it is determined in step S113 that the counter k is not 3, in step S114, the counter k is incremented by 1, and the process returns to step S104.

That is, as a result of the processing of steps S104 to S114 being repeated, each time the counter k is incremented by 1, the adjustment parameter in which the matching evaluation value error becomes the error minimum value error_min is switched in the order of ΔS0→ΔY0→ΔS1→ΔY1, and is obtained. Then, in step S113, when the counter k is k=3, that is, when all the four types of adjustment parameters ΔS0, ΔY0, ΔS1, and ΔY1 are obtained, the process proceeds to step S115.

In step S115, the inclination adjustment unit 123 determines whether or not the counter r of the number of repetitions has become a predetermined number of times, the search range and the change in the search variables are reduced a predetermined number of times, and all the four types of adjustment parameters ΔS0, ΔY0, ΔS1, and ΔY1 in which the matching evaluation value error becomes the error minimum value error_min have been obtained. When it is determined in step S115 that, for example, the number of repetitions is not a predetermined number of times, in step S116, the inclination adjustment unit 123 increments the counter r that counts the number of repetitions by 1. Then, in step S117, the inclination adjustment unit 123 increments the counter k that identifies the adjustment parameter Z(k) by 1, and the process returns to step S102. That is, as a result of the processing of steps S102 to S117 being repeated, while the adjustment parameters ΔS0, ΔY0, ΔS1, and ΔY1 are switched in the order of ΔS0→ΔY0→ΔS1→ΔY1, processing is repeated in which the search range and the change in the search variables are reduced, and in which the adjustment parameter Z(k) in which the matching evaluation value error becomes the error minimum value error_min is obtained. Then, when it is determined in step S115 that the processing is repeated the predetermined number of times, the process proceeds to step s116.

In step S116, the inclination adjustment unit 123 updates the base adjustment amount (ΔXbase, ΔYbase, ΔS0base, ΔY0base, ΔS1base, ΔY1base) on the basis of the minimum value (ΔXmin, ΔYmin, ΔS0min, ΔY0min, ΔS1min, ΔY1min) of the adjustment parameter in the error minimum value error_min. That is, the inclination adjustment unit 123 sets the base adjustment amount (ΔS0base, ΔY0base, ΔS1base, ΔY1base) to the minimum value (ΔS0min, ΔY0min, ΔS1min, ΔY1min) of the adjustment parameter in the error minimum value error_min, and the processing is completed.

Figure 13:
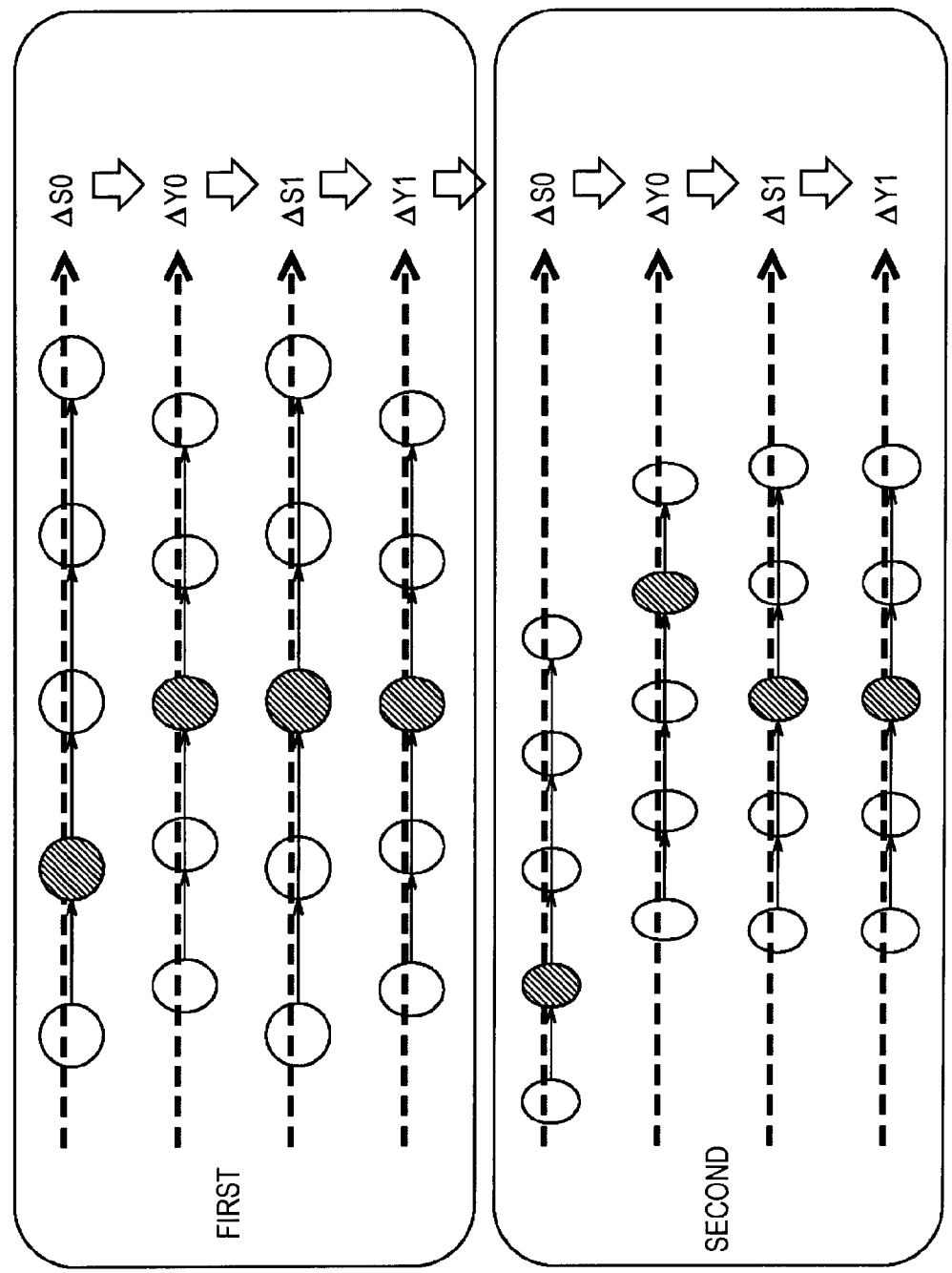
FIG. 13 illustrates an inclination adjustment process.

That is, when the pixels, each of which is indicated by the shaded circle mark, is obtained as the adjustment parameters ΔS0, ΔY0, ΔS1, and ΔY1 in which the error minimum value error_min is reached in the first process within the search range of each pixel indicated by the circle mark in the line with respect to the each of the adjustment parameters ΔS0, ΔY0, ΔS1, and ΔY1 corresponding to the first stage to the fourth stage of the upper area of FIG. 13, the inclination adjustment unit 123, in a second process, reduces the interval (ΔS0'step, ΔY0'step, ΔS1'step, ΔY1'step) between search pixels as indicated by the circle mark in the line with respect to each of the adjustment parameters ΔS0, ΔY0, ΔS1, and ΔY1 corresponding to the first stage to the fourth stage of the lower area of FIG. 13, and further sets the range in the vicinity of the searched pixel to a search range.

That is, as a result of the above processing, by reducing the search range and the change in the search variables a predetermined number of times in the range in the vicinity in which the base adjustment amount (ΔS0base, ΔY0base, ΔS1base, ΔY1base) has been obtained, the adjustment parameter (ΔS0, ΔY0, ΔS1, ΔY1) in which the matching evaluation value error becomes the error minimum value error_min can be repeatedly obtained. As a result, it becomes possible to obtain in detail the adjustment parameter (ΔS0, ΔY0, ΔS1, ΔY1) in which the matching evaluation value error becomes the error minimum value error_min.

Here, the description returns to the flowchart of FIG. 6.

As a result of the process of step S4, when the base adjustment amount (ΔY0base, ΔY0base, ΔS1base, ΔY1base) is obtained as the adjustment parameter (ΔS0, ΔY0, ΔS1, ΔY1) in which the matching evaluation value error becomes the error minimum value error_min, the process proceeds to step S5.

In step S5, the adjustment parameter update unit 81 stores the base adjustment amount (ΔXbase, ΔYbase, ΔS0base, ΔY0base, ΔS1base, ΔY1base) obtained by the above-mentioned processing of steps S3 and S4 as the adjustment parameter (ΔX, ΔY, ΔS0, ΔY0, ΔS1, ΔY1) in the adjustment parameter storage unit 82, and the processing is completed.

For example, in the case where the number of repetitions of the above-mentioned processing of steps S3 and S4 is set at 3, the range of the adjustment parameter in the horizontal direction is set as ΔX'min=−4.0/N and ΔX'max=+4.0/N, and the range thereof in the vertical direction is set as ΔY'min=−2.0/N and ΔY'max=+2.0/N. Furthermore, the interval in the horizontal direction may be set such that ΔX'step=−1.0/N, and the interval in the vertical direction may be set such that ΔY'step=−0.5/N and ΔY'max=+0.5/N. In addition, in this case, the range of the upper area inclination may be set such that ΔS0'min=−2.0/N and ΔS0'max=+2.0/N, and the range of the upper area vertical direction may be set such that ΔY0'min=−1.0/N and ΔY0'max=+1.0/N. Furthermore, in a similar case, the range of the inclination may be set such that ΔS1'min=−2.0, the interval of the upper area vertical direction may be set such that ΔY0'step=0.25/N, the interval of the inclination of the lower area may be set such that ΔS1'step=0.5/N, and the interval of the lower area in the vertical direction may be set such that ΔY1'step=0.25/N.

As a result of the above processing, it becomes possible to set the adjustment parameter so that the matching evaluation value error that evaluates the error amount in the disparity image obtained by the process of stereo matching based on the image, which is a captured stereo image, becomes a minimum. Consequently, it becomes possible to adjust the offset between the image-capturing directions of a plurality of cameras, which capture a stereo image in accordance with adjustment parameters. Furthermore, since the stereo matching process is repeated while the above-mentioned calibration process is performed, a disparity image continues to be generated. Consequently, it is possible to continue the calibration process while maintaining a state in which a disparity image continues to be generated. Thus, it is not necessary to separately provide a step of performing calibration while the image processing apparatus is manufactured as a product. Thus, it becomes possible to realize calibration by only using the image processing apparatus by the user without incurring a manufacturing cost. Furthermore, it is possible to repeat calibration while a disparity image continues to be generated. Thus, even if the optical axes of the cameras 21-1 and 21-2 change due to long-term deterioration, it becomes possible to perform calibration in response to the change. Furthermore, it is possible to perform calibration on the basis of the matching evaluation value obtained by using the entire range of the captured image. Consequently, it becomes possible to perform calibration with high robustness.

2. Second Embodiment

Another Exemplary Configuration of Image Processing Apparatus

Figure 14:
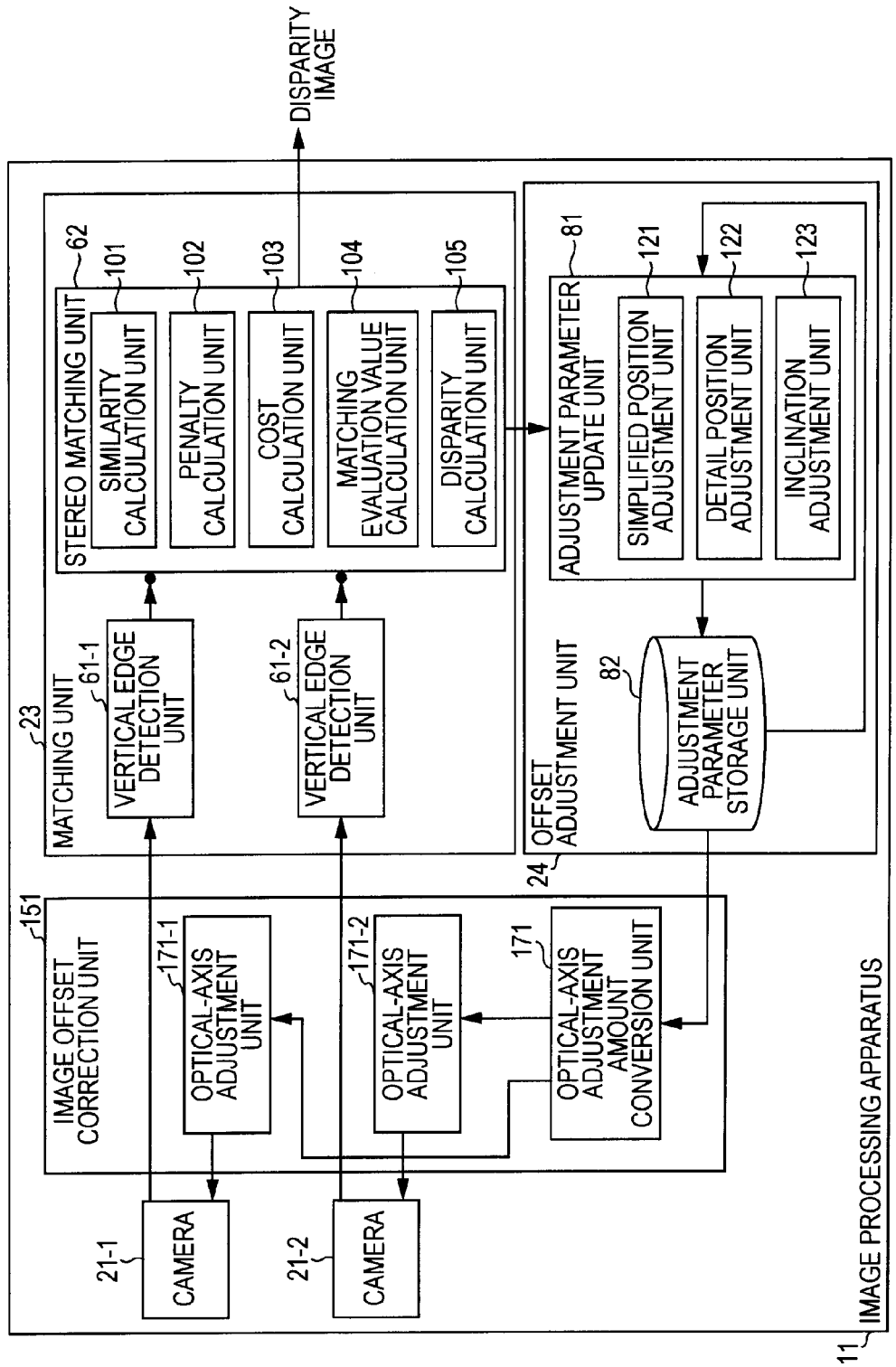
FIG. 14 is a block diagram illustrating an exemplary configuration of a second embodiment of the image processing apparatus to which the present disclosure is applied.

Although a case in which a calibration process is realized using a software program has been described hereinbefore, calibration may be realized by controlling the operation of hardware that controls the image-capturing directions or the like of the cameras 21-1 and 21-2. FIG. 14 illustrates an example of the configuration of another embodiment of hardware of an image processing apparatus to which the present disclosure is applied, in which calibration can be performed by controlling the operation of hardware. The components in FIG. 14, which are identical to those of FIG. 1, are designated with the same names and reference numerals, and the description thereof is thus omitted as appropriate.

A difference of the image processing apparatus 11 of FIG. 14 from the image processing apparatus 11 of FIG. 1 is that an image offset correction unit 151 is provided in place of the image offset correction unit 22.

In the image offset correction unit 22, correction images are generated by correcting respective images of the cameras 21-1 and 21-2, which are captured in accordance with a software program. In comparison, the image offset correction unit 151 controls the image-capturing directions of the cameras 21-1 and 21-2 so as to generate correction images.

Figure 15:
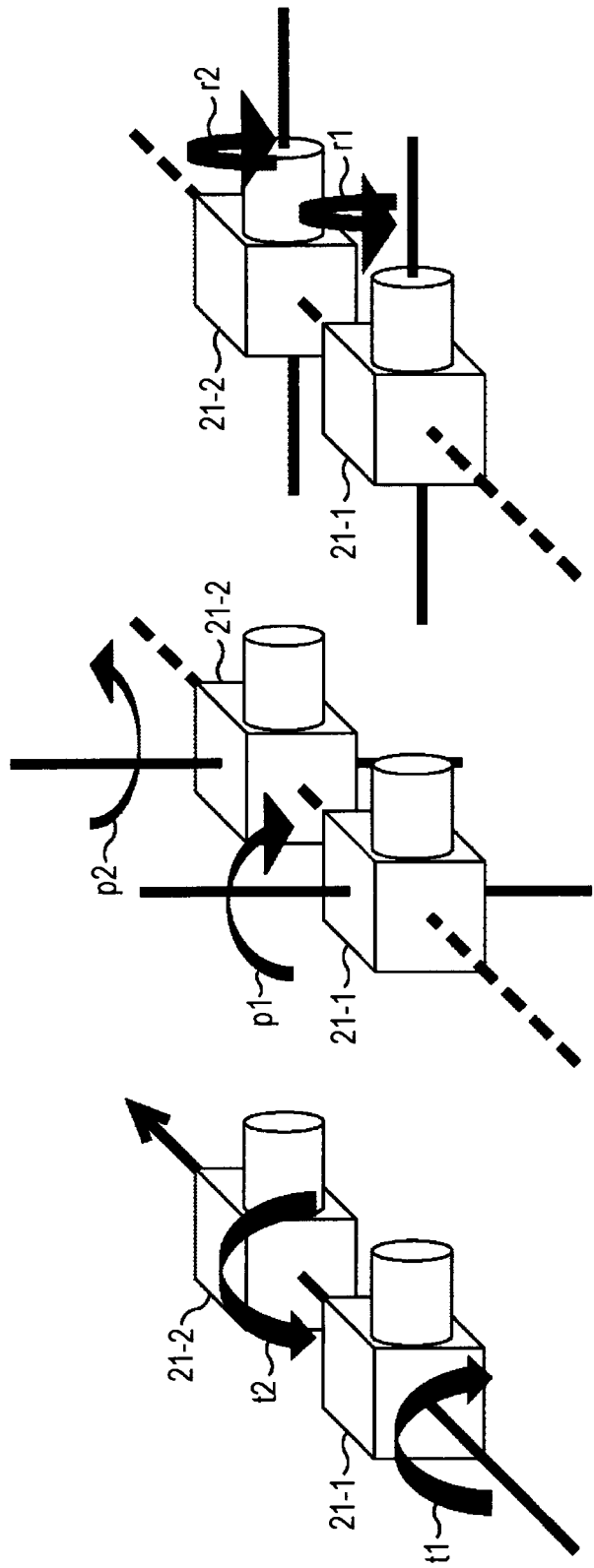
FIG. 15 illustrates the amount of optical-axis adjustment.

Specifically, the image offset correction unit 151 controls the tilt direction of the cameras 21-1 and 21-2, as indicated by the arrows t1 and t2 in the left area of FIG. 15. Furthermore, the image offset correction unit 151 controls the pan direction of the cameras 21-1 and 21-2, as indicated by the arrows p1 and p2 in the central portion of FIG. 15. In addition, the image offset correction unit 151 controls the rotational direction of the cameras 21-1 and 21-2, as indicated by the arrows r1 and r2 of the right area of FIG. 15.

In more detail, the image offset correction unit 151 includes an optical-axis adjustment amount conversion unit 171, and optical-axis adjustment units 172-1 and 172-2. The optical-axis adjustment amount conversion unit 171 generates an optical-axis adjustment amount that controls tilt, pan, and rotation of each of the cameras 21-1 and 21-2 on the basis of the adjustment parameter ($\Delta X$, $\Delta Y$, $\Delta S0$, $\Delta Y0$, $\Delta S1$, $\Delta Y1$) stored in the adjustment parameter storage unit 82.

The optical-axis adjustment units 172-1 and 172-2 physically control respective tilt, pan, and rotation of the cameras 21-1 and 21-2, and corrects the offset of the image captured by each of the cameras 21-1 and 21-2, thereby generate correction images, and supply the images to the matching unit 23.

Regarding the calibration process in the image processing apparatus 11 of FIG. 14, only some of steps S2 to S4 of FIG. 6 differ. Thus, only different processes will be described.

Simplified Position Adjustment Process

Figure 16:
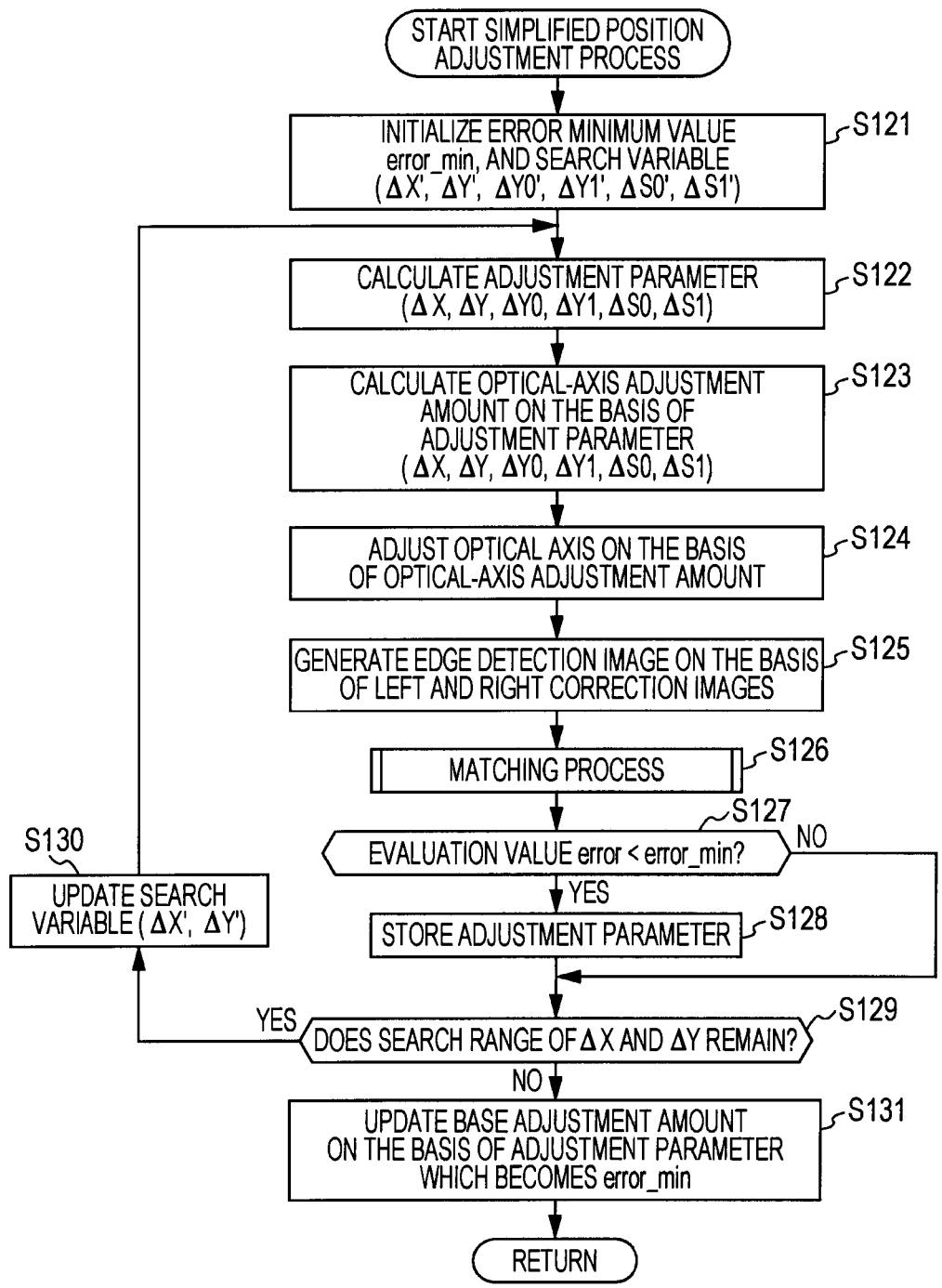
FIG. 16 is a flowchart illustrating a simplified position adjustment process performed by the image processing apparatus of FIG. 14.

A description will be given, with reference to the flowchart of FIG. 16, of a simplified position adjustment process, which is a different process. The processing in the flowchart of FIG. 16 is the same as the processing of steps S21, S22, and S25 to S31 in the flowchart of FIG. 7 except for the processing of steps S123 and S124. Thus, the description thereof is omitted.

That is, in step S123, the optical-axis adjustment amount conversion unit 171 obtains the amount of adjustment of tilt on the basis of the adjustment parameter ($\Delta Y$, $\Delta Y0$, $\Delta Y1$) stored in the adjustment parameter storage unit 82, obtains the amount of adjustment of pan on the basis of the adjustment parameter $\Delta X$, and obtains the amount of adjustment of rotation on the basis of the adjustment parameter ($\Delta S0$, $\Delta S1$). Then, the optical-axis adjustment amount conversion unit 171 supplies the obtained information on the adjustment amount to the optical-axis adjustment units 172-1 and 172-2.

In step S124, the optical-axis adjustment units 172-1 and 172-2 control pan, tilt, and rotation of the cameras 21-1 and 21-2 on the basis of the adjustment amount from the optical-axis adjustment amount conversion unit 171, thereby generate correction images, and supply the images to the matching unit 23.

Regarding the detailed position adjustment process and the inclination adjustment process corresponding to the processing of steps S3 and S4, respectively, the corresponding processing of steps S85 and S86 and the corresponding processing of steps s105 and S106, are made to be the same as the processing of steps S123 and S124, making it possible to realize the same processing. Thus, the description thereof is omitted.

As a result of the above processing, also in the image processing apparatus 11 of FIG. 14, it becomes possible to obtain the same advantages as those of the calibration process in the case of the image processing apparatus 11 of FIG. 1.

3. Third Embodiment

Another Exemplary Configuration of Image Processing Apparatus

In the foregoing, an example has been described in which, in a stereo matching process, a disparity is obtained by using dynamic programming or the like, and thereafter, a matching evaluation value is calculated. However, calculation of a disparity using dynamic programming has a high processing load, and consequently, processing takes time. Therefore, by defining a matching evaluation value error with a simpler method, a stereo matching process may be realized without calculating a disparity by using dynamic programming or the like.

Figure 17:
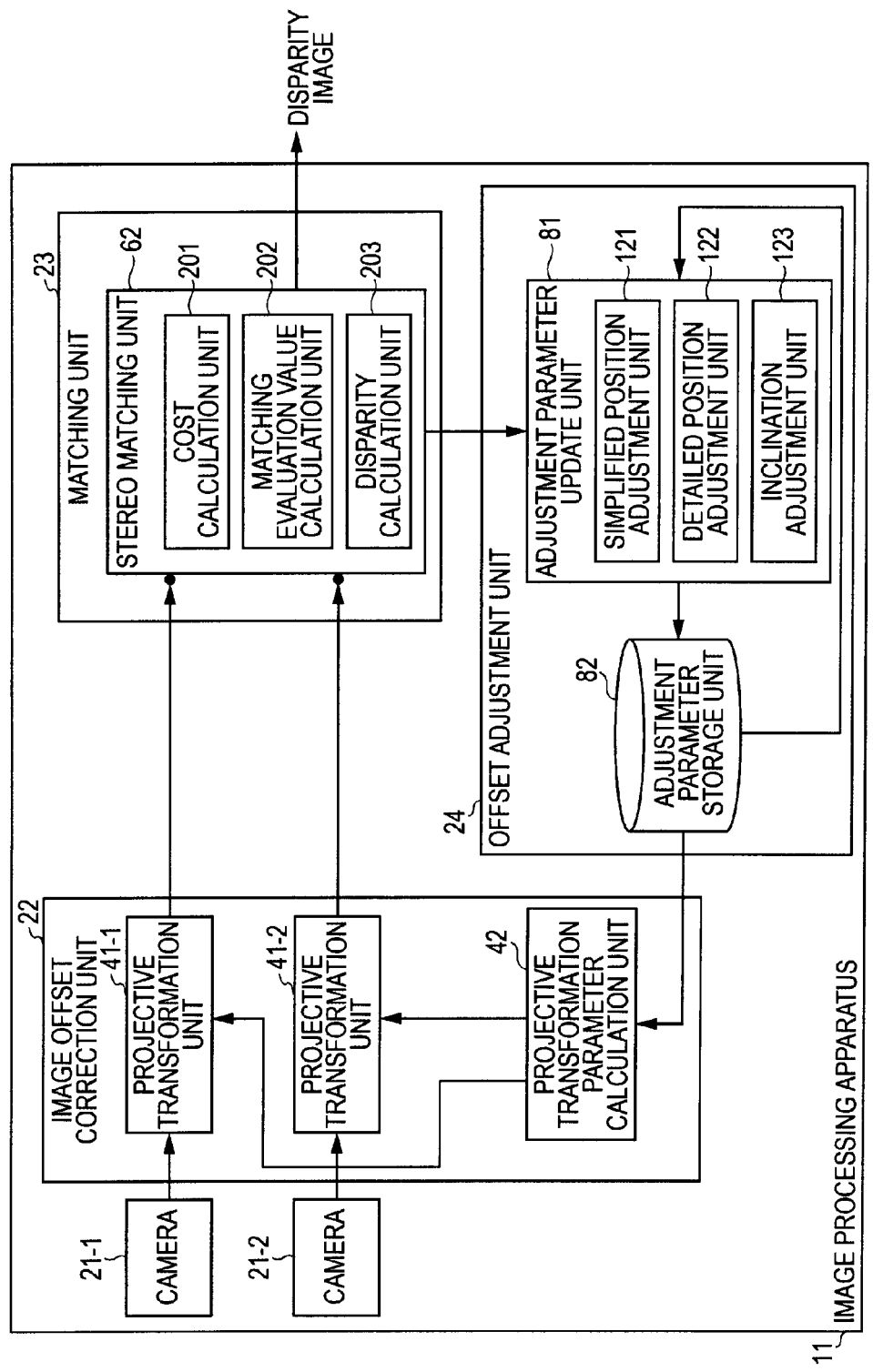
FIG. 17 is a block diagram illustrating an exemplary configuration of a third embodiment of the image processing apparatus to which the present disclosure is applied.

FIG. 17 shows an exemplary configuration of the image processing apparatus 11 that is configured to calculate a matching evaluation value error in a simple manner in a stereo matching process. The components of the image processing apparatus 11 in FIG. 17, which have the same functions as those of the image processing apparatus 11 in FIG. 1, are designated with the same names and reference numerals. Accordingly, the descriptions thereof are omitted as appropriate. More specifically, the differences of the image processing apparatus 11 in FIG. 17 from the image processing apparatus 11 in FIG. 1 are that in the matching unit 23, the vertical edge detection units 61-1 and 61-2 are deleted and that in the stereo matching unit 62, a cost calculation unit 201, a matching evaluation value calculation unit 202, and a disparity calculation unit 203 are provided in place of the similarity calculation unit 101 through to the disparity calculation unit 105.

Figure 18:
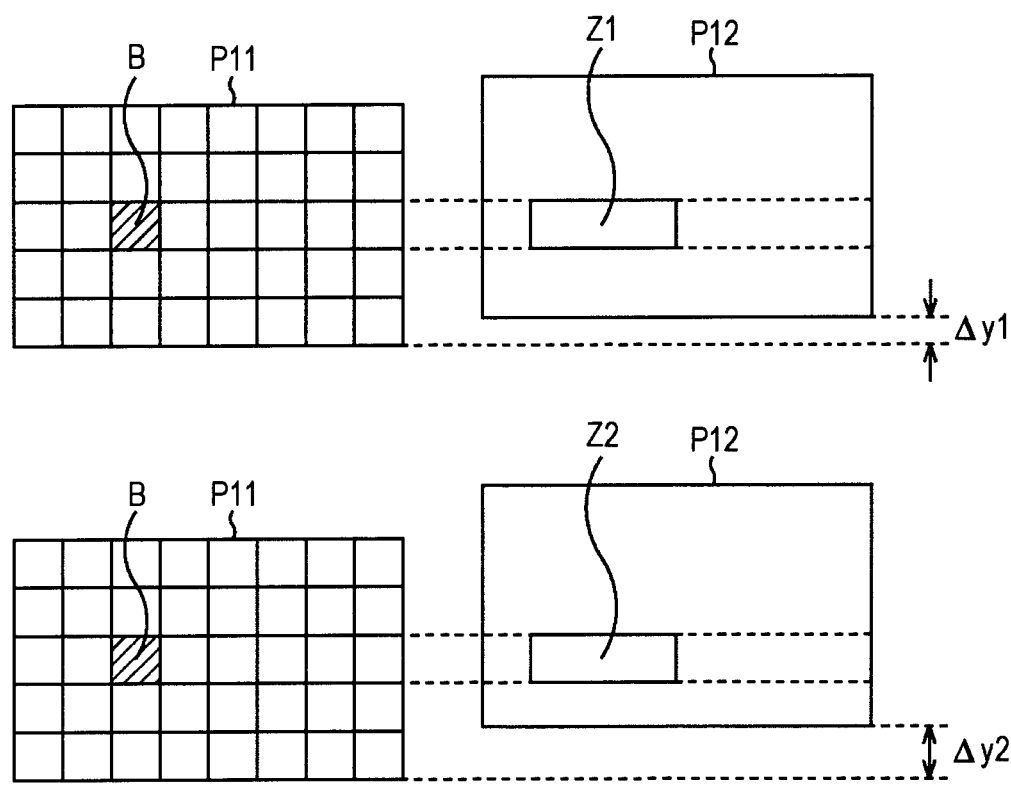
FIG. 18 illustrates a stereo matching process performed by the image processing apparatus of FIG. 17.

As shown in FIG. 18, the cost calculation unit 201 calculates the minimum value of the cost indicating the evaluation value of the matching error amount between blocks in the right and left images that are supplied from the image offset correction unit 22 in correspondence with the offset amount while the right and left images are offset in the vertical direction. More specifically, as shown in the upper area of FIG. 18, for example, a left image P11 serving as a standard is divided into blocks at a predetermined size. Then, the cost calculation unit 201, for example, calculates, as the cost, the inter-pixel difference sum between blocks, which is obtained while shifting the images in sequence in units of pixels in the horizontal direction within an area Z1 of a right image P12 corresponding to a block B of the upper area of FIG. 18. The area Z1 is set to contain, for example, a range in the right image P12 that is at the same height as the block B and that corresponds to the horizontal position of the block B in the left image P11 with the range being longer than the block B in the horizontal direction, for example, in a state in which the right image P2 is shifted by the offset amount Δy in the vertical direction with respect to the left image P1. Furthermore, as shown in the lower area of FIG. 18, the cost calculation unit 201 causes the left image P11 to change in units of pixels from an offset amount Δy1 in the vertical direction to, for example, an offset amount Δy2, and sets an area Z2 in accordance with the offset amount Δy so as to sequentially calculate the cost, and stores it in correspondence with the offset amount Δy.

Figure 19:
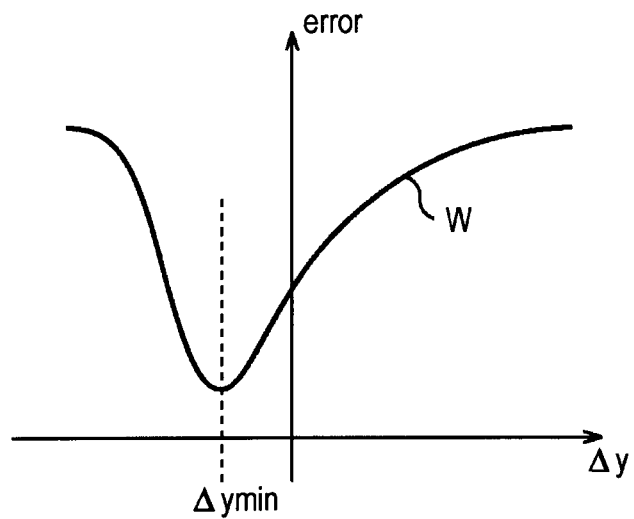
FIG. 19 illustrates a stereo matching process performed by the image processing apparatus of FIG. 17.

The matching evaluation value calculation unit 202 first obtains, for each offset amount Δy in the vertical direction, the cost that becomes a minimum, which is obtained in the area that is set in the corresponding right image in units of blocks that are set in the left image serving as a standard. Then, the matching evaluation value calculation unit 202 calculates the total sum, for all the images, of the cost that is a minimum, which is obtained with respect to all the blocks, as a matching evaluation value error for each offset amount Δy. As a result of such processing, the matching evaluation value calculation unit 202 obtains, for example, a waveform W indicating a change in the matching evaluation value error with respect to the offset amount Δy, as shown in FIG. 19. Furthermore, as shown in FIG. 19, the matching evaluation value calculation unit 202 outputs the matching evaluation value error of an offset amount Δymin at which the matching evaluation value error for each offset amount Δy becomes a minimum as the matching evaluation value error with respect to the right image P12 when the left image P11 is used as a standard.

Figure 20:
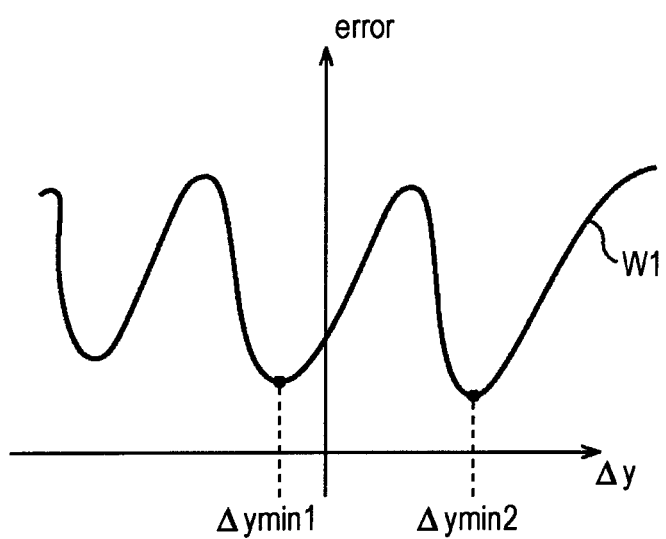
FIG. 20 illustrates a stereo matching process performed by the image processing apparatus of FIG. 17.

In the case of two stereo images such that a lattice-shaped window glass provided on the side wall of a building is projected as a result of capturing an image of a building at a position away by a predetermined distance, there is a case in which the relation between the matching evaluation value error for each offset amount Δy and the offset amount Δy becomes, for example, a waveform W1 shown in FIG. 20. In such a case, there are a plurality of local minimum values. For this reason, for example, when a local minimum value that is a minimum value is set as a matching evaluation value of the right image with respect to the left image serving as a standard, in FIG. 20, even if an offset amount Δymin1 is a correct matching evaluation value error, in some cases, an error occurs as a result of an offset amount Δymin2, which is smaller than the offset amount Δymin1, being set as the matching evaluation value error of the right image with respect to the left image.

However, in general, in the case of a device such that one housing is provided with two cameras, such as a 3D camera or a 3D video camera, it is expected that the offset amount Δy between two images is small. More specifically, in the case of an image-capturing device having two cameras provided in one housing, since an approximate position between the cameras is fixed, it is expected that the positional relationship is changed to a certain degree due to vibration, long-term deterioration, or impact. Consequently, in the case that one housing is provided with two cameras, it is assumed that for the offset amount Δy between two images, a correct answer exists near a state in which there is no vertical offset, that is, near the vertical offset amount Δy=0. Therefore, in such a case as in FIG. 20, it is assumed that the matching evaluation value error in the offset amount Δymin1 close to the offset amount Δy=0 is adopted.

The disparity calculation unit 203 obtains a disparity in units of pixels on the basis of the relationship between pixels, which is formed of relations between each block of the left image in which the matching evaluation value error obtained by the matching evaluation value calculation unit 202 becomes a minimum, and the corresponding block of the right image. Then, the disparity calculation unit 203 generates and outputs a disparity image on the basis of the obtained disparity.

Stereo Matching Process

Figure 21:
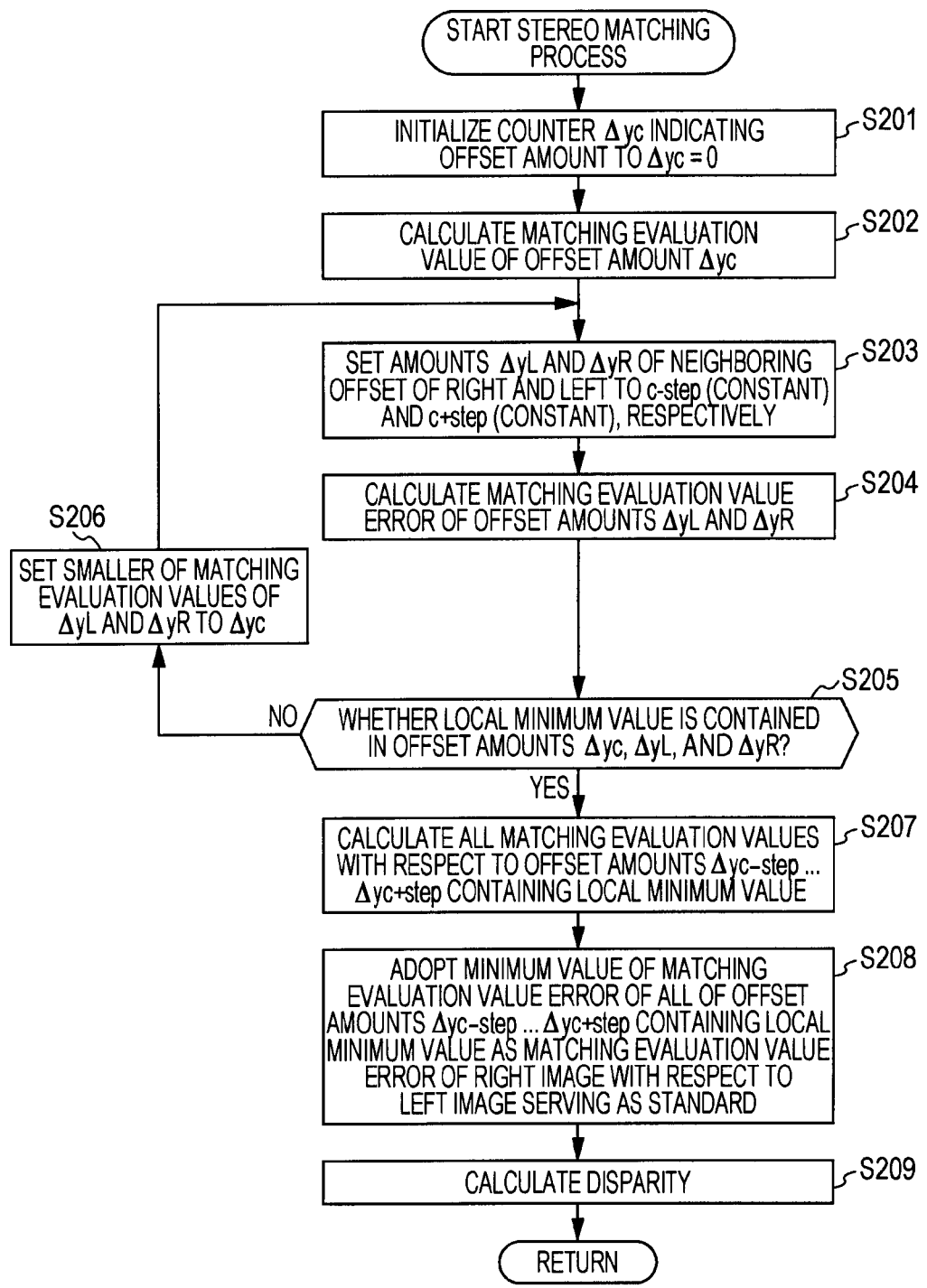
FIG. 21 is a flowchart illustrating a stereo matching process performed by the image processing apparatus of FIG. 17.

Next, a description will be given, with reference to the flowchart of FIG. 21, of a stereo matching process performed by the image processing apparatus 11 of FIG. 17.

The calibration process of the image processing apparatus 11 of FIG. 17 is substantially the same as the calibration process performed by the image processing apparatus 11 of FIG. 1 described with reference to FIG. 6 except for the stereo matching process. Thus, here, only the stereo matching process will be described. However, in the image processing apparatus 11 of FIG. 17, since the vertical edge detection units 61-1 and 61-2 are omitted, a process for generating an edge detection image on the basis of the left and right correction images is omitted. More specifically, the processes of step S25 in the simplified position adjustment process of FIG. 7, step S87 in the detailed position adjustment process of FIG. 10, and step S107 in the inclination adjustment process of FIG. 12 are omitted.

Here, an example is described in which a matching evaluation value, and a disparity up to the corresponding point of the right image when the left image among the images captured by the cameras 21-1 and 21-2 as a standard are to be obtained. Furthermore, the left image is denoted as p(x, y), the right image is denoted as q(x, y), and the disparity to be obtained is denoted as disparity(x, y) (d_min≤disparity(x, y)≤d_max). d_min is the minimum value of the disparity to be obtained, for example, d_max=−63. d_max is the maximum value of the disparity to be obtained, for example, d_max=63.

In step S201, the cost calculation unit 201 initializes the counter Δyc that indicates an offset amount to Δyc=0.

In step S202, when the cost calculation unit 201 calculates a matching evaluation value, which is the evaluation value of the matching error amount of the offset amount Δyc, the cost calculation unit 201 calculates, for each block of the left image serving as a standard, the following equation (26) so as to calculate the cost (x, y, d) while shifting the reference area of the corresponding right image in the horizontal direction.

$$\text{cost}(x, y, d) = \sum_{i=-1,0,1} \sum_{j=-1,0,1} \text{ABS}(p(x+i, y+i) - q(x+d+i, y+j)) \quad (26)$$

In equation (26) that obtains the cost(x, y, d), an example is described in which the difference absolute value sum (SAD) of the luminance difference of the block area of 3×3 pixels is used; however, the block area is not limited to this block size. Furthermore, when the cost(x, y, d) is to be obtained, a calculation using a difference sum of squares (SSD) rather than a difference absolute value sum (SAD) may be performed. Here, d is the offset amount in the horizontal direction.

In addition, with respect to each block, the matching evaluation value calculation unit 202 selects an offset amount in the horizontal direction, which is min(cost(x, y, d)), whose cost (x, y, d) is minimum, calculates the total sum in all the blocks as shown in the following equation (27), and calculates the total sum as the matching evaluation value error of the offset amount Δyc.

$$\text{error} = \sum_{x,y} \min(\text{cost}(x, y, d)) \quad (27)$$

Figure 22:
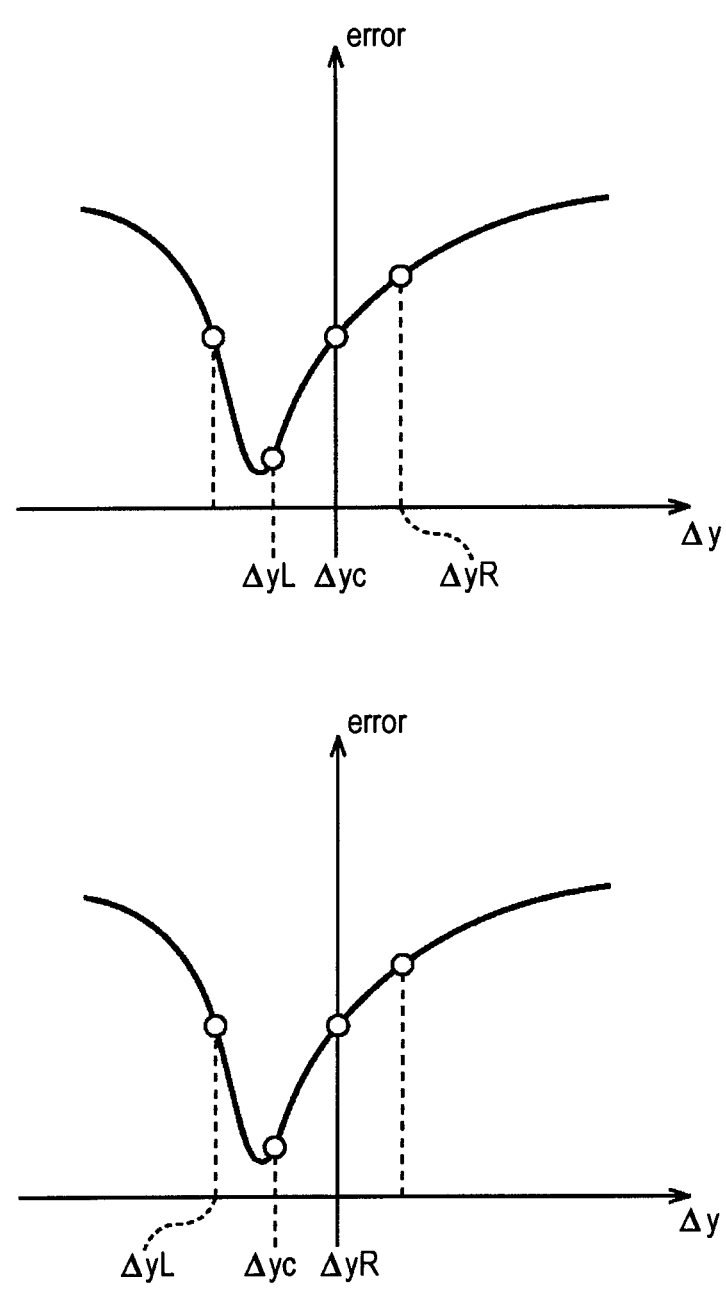
FIG. 22 illustrates a stereo matching process performed by the image processing apparatus of FIG. 17.

In step S203, the cost calculation unit 201 sets, with respect to the offset amount Δyc, offset amounts ΔyL (=c−step) and ΔyR (=c+step), which exist in the neighborhood separated by a predetermined distance (step: constant). With regard to the relation of the matching evaluation value error to the offset amount Δy, for example, as shown in FIG. 22, it is necessary to generate a waveform in which the horizontal axis represents an offset amount in the vertical direction and the vertical direction represents a matching evaluation value error for each offset amount. Consequently, the offset amount that is set in the left side to the offset amount Δyc in the waveform shown in FIG. 22 is set as an offset amount ΔyL (=c−step), and similarly, the offset amount that is set in the right side to the offset amount Δyc is set as an offset amount ΔyR (=c+step).

In step S204, the cost calculation unit 201 and the matching evaluation value calculation unit 202 calculate equations (26) and (27) described above, respectively, thereby calculating the cost and the matching evaluation value error in the respective offset amounts ΔyL and ΔyR.

In step S205, the matching evaluation value calculation unit 202 determines whether or not the local minimum value of the matching evaluation value error is contained in the range of the offset amounts ΔyL to ΔyR on the basis of whether or not the relation of the following equation (28) is satisfied.

$$\Delta y_n \text{ is at valley of error} = \quad (28)$$
$$\begin{cases} \text{true} & \therefore \text{error}(\Delta y_{n+i}) - \text{error}(\Delta y_n) > Th_0 \text{ and} \\ & \text{error}(\Delta y_{n-i}) - \text{error}(\Delta y_n) > Th_0 \\ \text{false} & \therefore \text{otherelse} \end{cases}$$

Here, Δyn represents the predetermined offset amount in the vertical direction, the offset amounts Δyn+i and Δyn−i are each an offset amount separated by i pixels in the positive and negative directions from the offset amount Δyn, respectively, and Th0 is a predetermined threshold value. Furthermore, here, the offset amounts Δyn−i, Δyn, and Δyn+i correspond to the offset amounts ΔyL, Δyc, and ΔyR, respectively, and i corresponds to step (i=step). More specifically, in a case where a waveform is formed in which the offset amount is plotted in the horizontal axis and the matching evaluation value is plotted in the vertical axis, when the matching evaluation value error is obtained in the order of the offset amounts ΔyL, Δyc, and ΔyR, when a downwardly convex waveform with the offset amount Δyc being an apex is formed, equation (28) becomes true (including a local minimum value) and when otherwise, equation (28) becomes false (not including a local minimum value). Therefore, for example, in such a case as that shown in the upper area of FIG. 22, the error monotonously increases in the order of the offset amounts ΔyL, Δyc, and ΔyR. As a result, since the relation of equation (28) above is not satisfied, the process proceeds to step S206.

In step S206, the matching evaluation value calculation unit 202 sets the counter Δyc so that the smaller of the matching evaluation value errors corresponding to the offset amounts ΔyL and ΔyR, respectively, becomes an offset amount Δyc, and the process returns to step S203.

More specifically, for example, as shown in the upper area of FIG. 22, in the case where the offset amount Δyc is set in the state of the offset amount Δyc=0, and the offset amounts ΔyL and ΔyR are set to the left and right thereof, when the error monotonously increases in the order of the offset amounts ΔyL, Δyc, and ΔyR, a local minimum value does not exist in the offset amounts ΔyL to ΔyR. Consequently, as shown in the lower area of FIG. 22, the offset amounts ΔyL to ΔyR are newly set. More specifically, in the upper area of FIG. 22, since the matching evaluation value error of the offset amount ΔyL among the offset amounts ΔyL and ΔyR is smaller, the offset amount ΔyL is set as the next offset amount Δyc, and new offset amounts ΔyL and ΔyR are set before and after the newly set offset amount Δyc. This is based on the constraint condition in which a local minimum value in which the offset amount Δyc is close to zero as described above is assumed as the matching evaluation value error (the matching evaluation value error of the reference image with respect to the standard image) of the right image with respect to the left image serving as a standard. The processing of steps S203 to S206 is sequentially repeated until a range containing the local minimum value such as that described above at a position close to the offset amount Δy=0 is searched.

In step S206, for example, as shown in the lower area of FIG. 22, a relation is reached in which a local minimum value is contained in the range of the offset amounts ΔyL to ΔyR, which is set in such a manner as to correspond to the offset amount Δyc, that is, when a downwardly convex waveform with the matching evaluation value of the offset amount Δyc being a local minimum value is formed, the condition of equation (28) is satisfied. Thus, the process proceeds to step S207.

Figure 23:
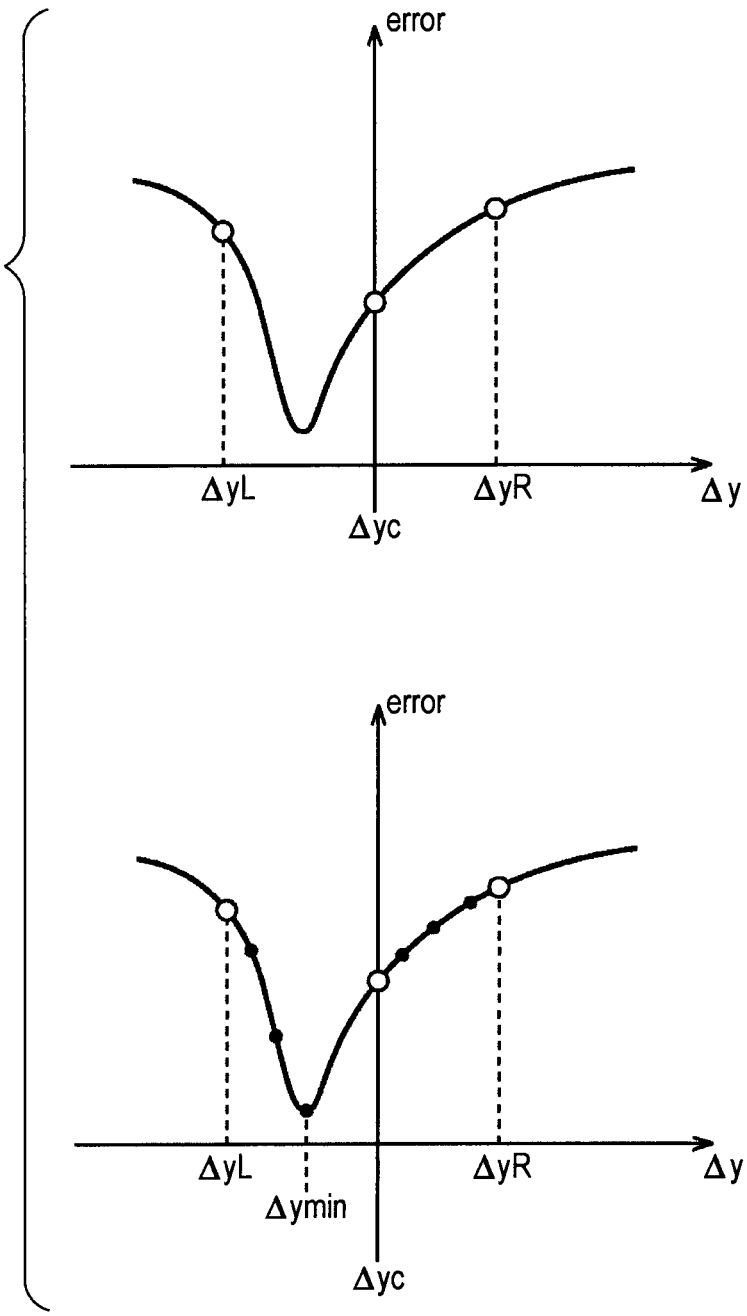
FIG. 23 illustrates a stereo matching process performed by the image processing apparatus of FIG. 17.

In step S207, the cost calculation unit 201 and the matching evaluation value calculation unit 202 calculate all the matching evaluation values, which exist between the offset amounts Δyc−step and Δyc+step corresponding to the offset amounts ΔyL and ΔyR, respectively. More specifically, as shown by the white circles in the upper area of FIG. 23, when the offset amounts ΔyL and ΔyR are brought into a relation of containing a local minimum value that is set in such a manner as to correspond to the offset amount Δyc, all the matching evaluation values, which are indicated by the black circles in the lower area of FIG. 23, are obtained.

In step S208, the matching evaluation value calculation unit 202 adopts the minimum value of the matching evaluation values for all the offset amounts, which exist between the offset amounts Δyc−step and Δyc+step, as the matching evaluation value error of the right image (reference image) with respect to the left image (standard image). More specifically, regarding the matching evaluation value error of the right image, which is a reference image for the left image (a standard image obtained in this manner), the local minimum value of the matching evaluation value error, which is an offset amount closest to the offset amount Δy=0, is adopted. Therefore, for example, in the case such as that shown in the lower area of FIG. 23, the matching evaluation value error at a position indicated by the offset amount Δymin among all the obtained matching evaluation value errors is adopted as the matching evaluation value error of the right image with respect to the left image that is the standard image.

In step S209, the disparity calculation unit 203 calculates a disparity on the basis of the relation between the blocks of the left and right images corresponding to the offset amount Δy that is adopted in the matching evaluation value error, generates a disparity image, and outputs it.

With the above processing, as a result of setting i=step to be large to a certain degree with respect to the minimum unit of the offset in the vertical direction, after a search is roughly made in a range in which the local minimum value of the matching evaluation value exists starting from a range close to the offset amount Δy=0, the matching evaluation value error is calculated in detail with regard to all the offset amounts Δy, making it possible to identify at a high speed the matching evaluation value error of the reference image with respect to the standard image. Furthermore, in the above stereo matching process, processing with a large processing load, such as dynamic programming, is not included, making it possible to reduce the processing load and increase the processing speed. If a matching evaluation value is obtained at intervals sufficiently small with respect to the distance from the offset amount Δyc set as a step, after the range containing a local minimum value is obtained, it is not necessarily necessary to obtain the matching evaluation values for all the offset amounts. More specifically, it is sufficient to determine that the matching evaluation value for any offset amount satisfies the constraint condition in which the matching evaluation value is closest to the offset amount Δy=0 and is a local minimum value. Consequently, it is not necessary to obtain all the matching evaluation values for the offset amount, and the number of intervals thereof may be reduced as necessary. As described above, by obtaining the matching evaluation values for the offset amount, by reducing the number of the intervals, it is possible to more reduce the load of the stereo matching process and more increase the processing speed.

In the foregoing, whether or not a local minimum value is contained is determined on the basis of whether or not the relation of equation (28) above is satisfied. Another method may be used as long as the determination as to whether or not a local minimum value is contained is possible. For example, whether or not a local minimum value is contained may be determined on the basis of the inclination relation such as that shown in the following equation (29).

$$\Delta y_n \text{ is at valley of error} = \begin{cases} \text{true} & \therefore \dfrac{\text{error}(\Delta y_{n+i}) - \text{error}(\Delta y_n)}{(n+i)-n} > Th_1 \text{ and} \\ & \dfrac{\text{error}(\Delta y_n) - \text{error}(\Delta y_{n-i})}{n-(n-i)} < -Th_1 \\ \text{false} & \therefore \text{otherelse} \end{cases} \quad (29)$$

Here, Th1 represents a predetermined threshold value. More specifically, in equation (29), when the inclination of the matching evaluation value for the offset amount is a positive inclination larger than a predetermined threshold value Th1 with respect to the offset amount Δyn to the offset amount Δyn+i, and when the inclination of the matching evaluation value for the offset amount is a negative inclination smaller than a predetermined threshold value −Th1 with respect to the offset amount Δyn−1 to the offset amount Δyn, equation (29) becomes true (including a local minimum value), and when otherwise, equation (29) becomes false (not including a local minimum value).

According to the above, it is possible to realize a stereo matching process without using calculations having a large load, such as dynamic programming, thereby making it possible to increase the processing speed. Furthermore, the range containing the local minimum value of the matching evaluation value is sequentially searched from the neighborhood containing the offset amount Δy=0 in such a manner as to be separated from the offset amount Δy=0 at coarse accuracy, and thereafter, the matching evaluation value of only the searched range is obtained in detail so as to search for a local minimum value. As a result, it becomes possible to search, as the matching evaluation value of the reference image with respect to the standard image, for a matching evaluation value for the offset amount Δy, which is closest to the offset amount Δy=0 and is a local minimum value, at a high speed. In the case that the processing speed of the image processing apparatus 11 is, for example, sufficiently fast, and the image processing apparatus 11 can perform more processing, after all the matching evaluation values for the offset amount Δy are obtained, the matching evaluation value, which is closest to the offset amount Δy=0 and is a local minimum value, is searched as a matching evaluation value of the reference image with respect to the standard image. In addition, in the foregoing, an example has been described in which a matching evaluation value is obtained with respect to an offset amount Δy in the vertical direction. Alternatively, similarly, a matching evaluation value may be obtained for an offset amount in the horizontal direction, so that the minimum value thereof is set as a matching evaluation value of the reference image with respect to the standard image.

The above-described series of image processing can be performed by hardware and also by software. When the series of processing is to be performed by software, a program constituting the software is installed from a recording medium into a computer that is incorporated in dedicated hardware, or such a program is installed from a recording medium into a general-purpose computer capable of performing various processes by installing various programs.

Figure 24:
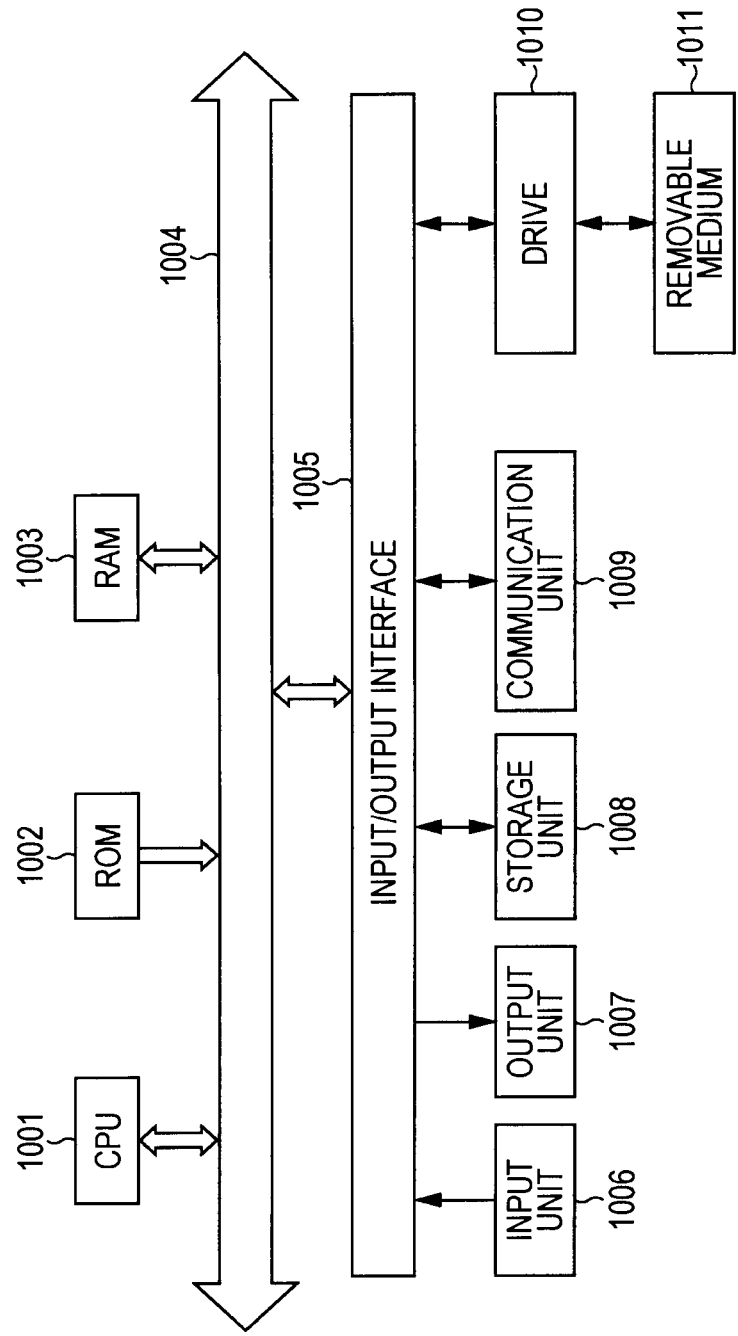
FIG. 24 illustrates an exemplary configuration of a general-purpose personal computer.

FIG. 24 illustrates an exemplary configuration of a general-purpose personal computer. The personal computer has a central processing unit (CPU) 1001 incorporated therein. An input/output interface 1005 is connected to the CPU 1001 through a bus 1004. A read only memory (ROM) 1002 and a random access memory (RAM) 1003 are connected to the bus 1004.

An input unit 1006 including input devices, such as a keyboard and a mouse, through which a user inputs an operation command, an output unit 1007 for outputting a processing operation screen and an image of a processing result to a display device, a storage unit 1008 including a hard disk drive for storing programs and various data, and a communication unit 1009 for performing a communication process via a network typified by the Internet, the communication unit 1009 including a local area network (LAN) adaptor or the like, are connected to the input/output interface 1005. Furthermore, a drive 1010 that reads and writes data from and to a removable medium 1011, such as a magnetic disc (including a flexible disc), an optical disc (CD-ROM (Compact Disc-Read Only Memory), and a DVD (Digital Versatile Disc), a magneto-optical disc (including an MD (Mini Disc)), or a semiconductor memory, is connected to the input/output interface 1005.

The CPU 1001 performs various types of processing in accordance with a program stored in the ROM 1002 or in accordance with a program that is read from the removable medium 1011, such as a magnetic disc, an optical disc, a magneto-optical disc, or a semiconductor memory, that is installed into the storage unit 1008, and that is loaded from the storage unit 1008 to the RAM 1003. Data or the like that is necessary for the CPU 1001 to perform various types of processing is also stored as appropriate in the RAM 1003.

In the computer configured as described above, the CPU 1001 loads a program stored in the storage unit 1008 into the RAM 1003 and executes the program through the input/output interface 1005 and the bus 1004, thereby performing the above-described series of processing.

The program executed by the computer (CPU 1001) can be provided in such a manner that, for example, it is recorded on a removable medium 1011 as a packaged medium. Furthermore, the program can be provided through a wired or wireless transmission medium, such as a local area network, the Internet, or a digital satellite broadcast.

In the computer, the program can be installed into the storage unit 1008 through the input/output interface 1005 by loading the removable medium 1011 into the drive 1010. Furthermore, the program can be received by the communication unit 1009 and installed into the storage unit 1008 through a wired or wireless transmission medium. In addition, the program can be installed in advance into the ROM 1002 and/or the storage unit 1008.

The program executed by the computer may be a program that is processed in a time-series manner in accordance with the order described in the present specification, and may be a program that is processed in parallel or at a necessary timing, such as when being called.

Furthermore, in the present specification, the system refers to an assembly of a plurality of components (devices, modules (parts), etc.), and it does not matter whether or not all the components are within the same housing. Therefore, a plurality of devices that are housed in separate housings and that are connected through a network, and one device in which a plurality of modules are housed within one housing, are both referred to as a system.

The embodiments of the present disclosure are not limited to the above-described embodiments, and various changes are possible within the scope not departing from the gist of the present disclosure.

For example, the present disclosure can take the configuration of cloud computing in which one function is shared by a plurality of devices through a network and processed in cooperation.

Furthermore, the steps described in the above-described flowcharts can be performed by one device and can also be shared and performed by a plurality of devices.

In addition, in a case where a plurality of processes are included in one step, the plurality of processes included in the one step can be performed by one device and can also be shared and performed by a plurality of devices.

The present disclosure can take the following configurations.

(1) An image processing apparatus including:
an image obtaining unit configured to obtain a plurality of images, which are images of the same subject captured from different viewpoints;
an image offset correction unit configured to modify the plurality of images obtained by the image obtaining unit on the basis of parameters for correcting image offset and generate a correction image for each of the obtained images;
an evaluation value calculation unit configured to calculate, as an evaluation value, an integration value, for an entire screen, of an error amount indicating a degree at which association in a parallax direction among the plurality of correction images that are generated by the image offset correction unit is not possible; and
an update unit configured to change a parameter that is necessary for association in the parallax direction among the parameters so as to update the parameter so that the evaluation value becomes a minimum.

(2) The image processing apparatus as set forth in (1), wherein the update unit changes a shift amount, among the parameters, at coarse intervals of pixels in a two-dimensional direction over the entire range of the image so as to update the shift amount to a shift amount for which the evaluation value becomes a minimum, and further changes the shift amount at detailed intervals of pixels in the two-dimensional direction over a range in the vicinity of the shift amount searched by changing the shift amount at the coarse intervals of pixels so as to update the shift amount to a shift amount for which the evaluation value becomes a minimum.

(3) The image processing apparatus as set forth in (1) or (2), wherein the update unit changes inclination components, among the parameters, which are perpendicular to a parallax search direction, which is a direction of association among the plurality of images, so as to update the inclination components to inclination components for which the evaluation value becomes a minimum.

(4) The image processing apparatus as set forth in (3), wherein the update unit divides the inclination components, among the parameters, in a direction perpendicular to a parallax search direction, which is a direction of association among the plurality of images, and individually changes the inclination component so as to update the inclination components to inclination components for which the evaluation value becomes a minimum.

(5) The image processing apparatus as set forth in one of (1) to (3), wherein the evaluation value calculation unit calculates, as an evaluation value, an integration value, for the entire screen, of an error amount indicating a degree at which association in the parallax direction among the plurality of correction images that are generated by the image offset correction unit is not possible so that contribution made by a peripheral portion of the image is small.

(6) The image processing apparatus as set forth in one of (1) to (5), wherein the evaluation value calculation unit calculates, as an entire screen total sum of difference absolute value sums of block matching, an integration value, for the entire screen, of an error amount indicating a degree at which association in the parallax direction among the plurality of correction images that are generated by the image offset correction unit is not possible, and sets a calculation result as an evaluation value.

(7) The image processing apparatus as set forth in (6), wherein the evaluation value calculation unit calculates, using dynamic programming, an integration value, for the entire screen, of an error amount indicating a degree at which association in the parallax direction among the plurality of correction images that are generated by the image offset correction unit is not possible, and sets a calculation result as an evaluation value.

(8) The image processing apparatus as set forth in (6), wherein the evaluation value calculation unit calculates, for each offset amount among the plurality of correction images, an integration value, for the entire screen, of an error amount indicating a degree at which association in the parallax direction among the plurality of correction images that are generated by the image offset correction unit is not possible, as an entire screen total sum of difference absolute value sums of block matching, and sets the local minimum value among the calculation results, in which the offset amount is closest to 0, as an evaluation value.

(9) The image processing apparatus as set forth in (8), wherein the evaluation value calculation unit calculates, at each coarse offset interval among the plurality of correction images, an integration value, for the entire screen, of an error amount indicating a degree at which association in the parallax direction among the plurality of correction images that are generated by the image offset correction unit is not possible, as an entire screen total sum of difference absolute value sums of block matching, searches the calculation results in a range in which the offset amount is closest to 0 and a local minimum value is contained, and sets the local minimum value of the entire screen total sum that is obtained in detail in the searched range as an evaluation value.

(10) The image processing apparatus as set forth in one of (1) to (9), wherein the evaluation value calculation unit calculates, as an evaluation value, a total sum of integration values, for the entire screen, of an error amount indicating a degree at which association in the parallax direction between a standard image and reference images other than the standard image from among the plurality of correction images that are generated by the image offset correction unit is not possible.

(11) The image processing apparatus as set forth in one of (1) to (10), further including an image-capturing unit configured to capture images of the same subject from different viewpoints,
wherein the image obtaining unit obtains a plurality of images, which are images of the same subject captured from different viewpoints by using the image-capturing unit, and
wherein the image offset correction unit modifies the plurality of images that are obtained by the image obtaining unit by moving an optical axis that becomes an image-capturing direction in the image-capturing unit on the basis of a parameter for correcting image offset, and generates a correction image for each of the obtained images.

(12) An image processing method for use with an image processing apparatus including:
an image obtaining unit configured to obtain a plurality of images, which are images of the same subject captured from different viewpoints,
an image offset correction unit configured to modify the plurality of images obtained by the image obtaining unit on the basis of parameters for correcting image offset and generate a correction image for each of the obtained images,
an evaluation value calculation unit configured to calculate, as an evaluation value, an integration value, for an entire screen, of an error amount indicating a degree at which association in a parallax direction among the plurality of correction images that are generated by the image offset correction unit is not possible, and
an update unit configured to change a parameter that is necessary for association in the parallax direction among the parameters so as to update the parameter so that the evaluation value becomes a minimum, the image processing method including:
obtaining, in the image obtaining unit, a plurality of images, which are images of the same subject captured from different viewpoints;
modifying, in the image offset correction unit, the plurality of images that are obtained in the process of the image obtaining on the basis of a parameter for correcting image offset and generating a correction image for each of the obtained images;
calculating, in the evaluation value calculation unit, as an evaluation value, an integration value, for an entire screen, of an error amount indicating a degree at which association in a parallax direction among the plurality of correction images that are generated in the process of the image offset correction is not possible; and
changing, in the update unit, a parameter that is necessary for association in the parallax direction among the parameters and updating the parameter so that the evaluation value becomes a minimum.

(13) A program for causing a computer that controls an image processing apparatus to perform processing, the image processing apparatus including:
an image obtaining unit configured to obtain a plurality of images, which are images of the same subject captured from different viewpoints,
an image offset correction unit configured to modify the plurality of images obtained by the image obtaining unit on the basis of parameters for correcting image offset and generate a correction image for each of the obtained images,
an evaluation value calculation unit configured to calculate, as an evaluation value, an integration value, for an entire screen, of an error amount indicating a degree at which association in a parallax direction among the plurality of correction images that are generated by the image offset correction unit is not possible, and
an update unit configured to change a parameter that is necessary for association in the parallax direction among the parameters so as to update the parameter so that the evaluation value becomes a minimum, the processing including:
obtaining, in the image obtaining unit, a plurality of images, which are images of the same subject captured from different viewpoints;
modifying, in the image offset correction unit, the plurality of images that are obtained in the process of the image obtaining on the basis of a parameter for correcting image offset and generating a correction image for each of the obtained images;
calculating, in the evaluation value calculation unit, as an evaluation value, an integration value, for an entire screen, of an error amount indicating a degree at which association in a parallax direction among the plurality of correction images that are generated in the process of the image offset correction is not possible; and
changing, in the update unit, a parameter that is necessary for association in the parallax direction among the parameters and updating the parameter so that the evaluation value becomes a minimum.

In this specification, steps describing a program recorded on a recording medium include processes that are performed in a time-series manner according to the written order, but also processes that are performed in parallel or individually although they may not be performed in a time-series manner.

The present application contains subject matter related to that disclosed in Japanese Priority Patent Application JP 2011-019274 filed in the Japan Patent Office on Jan. 31, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a processor;
a memory for storing instructions executable by the processor;
wherein the processor is configured to:
obtain a plurality of images of a subject captured from different viewpoints;
modify the plurality of images on the basis of adjustment parameters for correcting image offset and generate a correction image for each of the plurality of images, the adjustment parameters including parallax components for correcting the image offset in a parallax direction, and inclination components for correcting the image offset in a direction perpendicular to the parallax direction;

calculate an integration value over pixels of an entire screen, the integration value being an evaluation value of an error amount indicating a degree of matching among the plurality of correction images; and change the adjustment parameters so that the evaluation value becomes a minimum, wherein the parallax components of the adjustment parameters are changed at coarse intervals of pixels to reach a first set of parameters so that the evaluation value becomes a first minimum, and changed in the vicinity of the first set of parameters to reach a second set of parameters so that the evaluation value becomes a second minimum.

2. The image processing apparatus according to claim 1, wherein the processor is further configured to changes change a shift amount, among the adjustment parameters, at coarse intervals of pixels in a two-dimensional direction over the entire range of the image so as to update the shift amount to a shift amount for which the evaluation value becomes a minimum, and further change the shift amount at detailed intervals of pixels in the two-dimensional direction over a range in the vicinity of the shift amount searched by changing the shift amount at the coarse intervals of pixels so as to update the shift amount to a shift amount for which the evaluation value becomes a minimum.

3. The image processing apparatus according to claim 1, wherein the processor is further configured to change the inclination components, among the adjustment parameters, which are perpendicular to a parallax search direction, which is a direction of association among the plurality of images, so as to update the inclination components to inclination components for which the evaluation value becomes a minimum.

4. The image processing apparatus according to claim 3, wherein the processor is further configured to divide the inclination components, among the adjustment parameters, in a direction perpendicular to a parallax search direction, which is a direction of association among the plurality of images, and individually change the inclination component so as to update the inclination components to inclination components for which the evaluation value becomes a minimum.

5. The image processing apparatus according to claim 1, wherein the processor is further configured to calculate the integration value so that contribution made by a peripheral portion of the image is small.

6. The image processing apparatus according to claim 1, wherein the processor is further configured to calculate, as an entire screen total sum of difference absolute value sums of block matching, an integration value, for the entire screen, of an error amount indicating a degree of matching among the plurality of correction images, and set the calculation result as an evaluation value.

7. The image processing apparatus according to claim 6, wherein the processor is further configured to calculate, using dynamic programming, an integration value, for the entire screen, of an error amount indicating a degree of matching among the plurality of correction images, and set the calculation result as an evaluation value.

8. The image processing apparatus according to claim 6, wherein the processor is further configured to calculate, for each offset amount among the plurality of correction images, an integration value, for the entire screen, of an error amount indicating a degree of matching among the plurality of correction images, as an entire screen total sum of difference absolute value sums of block matching, and set the local minimum value among the calculation results, in which the offset amount is closest to 0, as an evaluation value.

9. The image processing apparatus according to claim 8, wherein the processor is further configured to calculate, at each coarse offset interval among the plurality of correction images, an integration value, for the entire screen, of an error amount indicating a degree of matching among the plurality of correction images, as an entire screen total sum of difference absolute value sums of block matching, search the calculation results in a range in which the offset amount is closest to 0 and a local minimum value is contained, and set the local minimum value of the entire screen total sum that is obtained in detail in the searched range as an evaluation value.

10. The image processing apparatus according to claim 1, wherein the processor is further configured to calculate, as an evaluation value, a total sum of integration values, for the entire screen, of an error amount indicating a degree of matching between a standard image and reference images other than the standard image from among the plurality of correction images.

11. The image processing apparatus according to claim 1, further comprising an image-capturing unit configured to capture the plurality of images of the same subject from different viewpoints, wherein the processor is configured to modify the plurality of images by moving an image-capturing direction of the image-capturing unit on the basis of the adjustment parameters for correcting image offset, and generate a correction image for each of the plurality of images.

12. An image processing method for use with an image processing apparatus, the method comprising:

obtaining a plurality of images of a subject captured from different viewpoints;

modifying the plurality of images on the basis of adjustment parameters for correcting image offset and generating a correction image for each of the plurality of images, the adjustment parameters including parallax components for correcting the image offset in a parallax direction, and inclination components for correcting the image offset in a direction perpendicular to the parallax direction;

calculating an integration value over pixels of an entire screen, the integration value being an evaluation value of an error amount indicating a degree of matching among the plurality of correction images; and changing the adjustment parameters so that the evaluation value becomes a minimum, wherein the parallax components of the adjustment parameters are changed at coarse intervals of pixels to reach a first set of parameters so that the evaluation value becomes a first minimum, and changed in the vicinity of the first set of parameters to reach a second set of parameters so that the evaluation value becomes a second minimum.

13. A non-transitory computer-readable medium including instructions, which, when executed by a computer, cause the computer to control an image processing apparatus to perform an image processing method, the method comprising:

obtaining a plurality of images of a subject captured from different viewpoints;

modifying the plurality of images on the basis of adjustment parameters for correcting image offset and generating a correction image for each of the plurality of images, the adjustment parameters including parallax components for correcting the image offset in a parallax direction, and inclination components for correcting the image offset in a direction perpendicular to the parallax direction;

calculating an integration value over pixels of an entire screen, the integration value being an evaluation value of an error amount indicating a degree of matching among the plurality of correction images; and changing the adjustment parameters so that the evaluation value becomes a minimum, wherein the parallax components of the adjustment parameters are changed at coarse intervals of pixels to reach a first set of parameters so that the evaluation value becomes a first minimum, and changed in the vicinity of the first set of parameters to reach a second set of parameters so that the evaluation value becomes a second minimum.

\* \* \* \* \*